(12) United States Patent
Amirsolaimani et al.

(10) Patent No.: US 11,067,855 B2
(45) Date of Patent: Jul. 20, 2021

(54) APPARATUS AND METHODS FOR ALIGNING PHOTOPOLYMERS USING AN ASYMMETRICALLY FOCUSED BEAM

(71) Applicant: FACEBOOK TECHNOLOGIES, LLC, Menlo Park, CA (US)

(72) Inventors: Babak Amirsolaimani, Redmond, WA (US); Ying Geng, Bellevue, WA (US); Scott Charles McEldowney, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 148 days.

(21) Appl. No.: 16/407,020

(22) Filed: May 8, 2019

(65) Prior Publication Data

US 2020/0257171 A1   Aug. 13, 2020

Related U.S. Application Data

(60) Provisional application No. 62/804,121, filed on Feb. 11, 2019.

(51) Int. Cl.
*G02F 1/1337* (2006.01)
*G02B 5/30* (2006.01)
*G02B 5/18* (2006.01)

(52) U.S. Cl.
CPC .. *G02F 1/133788* (2013.01); *G02F 1/133753* (2013.01); *G02F 1/133757* (2021.01)

(58) Field of Classification Search
CPC ............... G02B 5/1857; G02B 5/3016; G02F 1/133711; G02F 1/133753; G02F 1/133788; G02F 2001/133757
See application file for complete search history.

(56) References Cited

U.S. PATENT DOCUMENTS

2011/0149221 A1\* 6/2011 Kato ..................... G02F 1/1339
                                                                349/123
2012/0188467 A1   7/2012 Escuti et al.
(Continued)

FOREIGN PATENT DOCUMENTS

CN            107966885 A      4/2018

OTHER PUBLICATIONS

Facebook Technologies, LLC, International Search Report and Written Opinion, PCT/US2020/016358, dated May 25, 2020, 14 pgs.

*Primary Examiner* — Hina F Ayub
(74) *Attorney, Agent, or Firm* — Morgan, Lewis & Bockius LLP

(57) ABSTRACT

A method for aligning a layer of photopolymers includes projecting light onto a rotating optical element and asymmetrically focusing the light transmitted through the rotating optical element onto a layer of photopolymers. The asymmetrically focused light is swept across different regions of the layer of photopolymers while a direction of polarization in the light is varied due to the rotation of the first optical element, producing a pattern of orientations for the layer of photopolymers. The method can be incorporated in a raster-scanning process to produce an alignment pattern in a layer of photopolymers with a large surface area, and is faster and provides improved precision and/or uniformity of the alignment pattern compared to currently available methods. An apparatus for aligning the layer of photopolymers is also disclosed.

20 Claims, 21 Drawing Sheets

(56) References Cited

U.S. PATENT DOCUMENTS

| | | |
|---|---|---|
| 2013/0089662 A1 | 4/2013 | Hoshi |
| 2013/0235283 A1* | 9/2013 | Mao .................. G02B 6/29302 349/1 |
| 2015/0331167 A1 | 11/2015 | Escuti et al. |
| 2015/0378168 A1 | 12/2015 | Stacey et al. |
| 2017/0052381 A1* | 2/2017 | Huang ................. B23K 26/073 |

* cited by examiner

US 11,067,855 B2

APPARATUS AND METHODS FOR ALIGNING PHOTOPOLYMERS USING AN ASYMMETRICALLY FOCUSED BEAM

RELATED APPLICATIONS

This application claims the benefit of, and priority to, U.S. Provisional Patent Application Ser. No. 62/804,121, entitled "Apparatus and Method for Aligning Photopolymers Using an Asymmetrically Focused Beam," filed Feb. 11, 2019, which is incorporated by reference herein in its entirety.

TECHNICAL FIELD

This relates generally to configuring optical elements and in particular, to apparatus and methods for aligning photopolymers using a cylindrical beam.

BACKGROUND

Optical elements that include liquid crystals (such as liquid crystal gratings and polarization volume gratings, among others) have gained increasing interest for applications in optics, such as beam steering devices, switchable optical elements, and display technologies.

Fabrication of such optical elements often require a layer of (also called a photoalignment layer) that have been aligned in a specific pattern. Current methods of aligning photopolymers are time consuming and lack precision.

SUMMARY

Accordingly, there is a need for a method of aligning photopolymers that is faster and provides improved precision and/or uniformity of the alignment pattern compared to currently available methods.

In accordance with some embodiments, a method of aligning a layer of photopolymers includes receiving incident light at a first optical element and rotating the first optical element about an optical axis of the first optical element. An angle between a second optical axis of the first optical element and a reference axis is varied across a range of angles as the first optical element is rotated. The range of angles includes a first angle and a second angle. The first optical element, at the first angle, converts the incident light into first light having first polarization corresponding to the first angle. The first optical element, at the second angle, converts the incident light into second light having second polarization corresponding to the second angle. The method also includes focusing the light output from the first optical element asymmetrically with respect to the optical axis. The first light is focused onto a first region of the layer of photopolymers to align the photopolymers in the first region along a first direction, and the second light is focused onto a second region of the layer of photopolymers to align the photopolymers in the second region along a second direction different from the first direction.

In accordance with some embodiments, an apparatus for aligning a layer of photopolymers includes a first optical element and a second optical element. The first optical element is configured to receive incoming light and to output light in response to incoming light. The second optical element is configured to focus the light output from the first optical element asymmetrically with respect to an optical axis of the first optical element. The first optical element is further configured to be rotated about the optical axis across a range of angles. The range of angles includes a first angle relative to a reference axis of the first optical element and a second angle, distinct from the first angle, relative to the reference axis. The first optical element, at the first angle, is configured to output first light having first polarization in response to receiving the incoming light and the second optical element is configured to focus the first light onto a first region of the layer of photopolymers to align the photopolymers in the first region along a first direction. The first optical element, at the second angle, outputs second light having second polarization in response to receiving the incoming light and the second light is focused onto a second region of the layer of photopolymers to align the photopolymers in the second region along a second direction different from the first direction.

Thus, the disclosed embodiments provide a method and apparatus for aligning photopolymers that is faster and provides improved precision and/or uniformity of the alignment pattern compared to currently available methods.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1A:
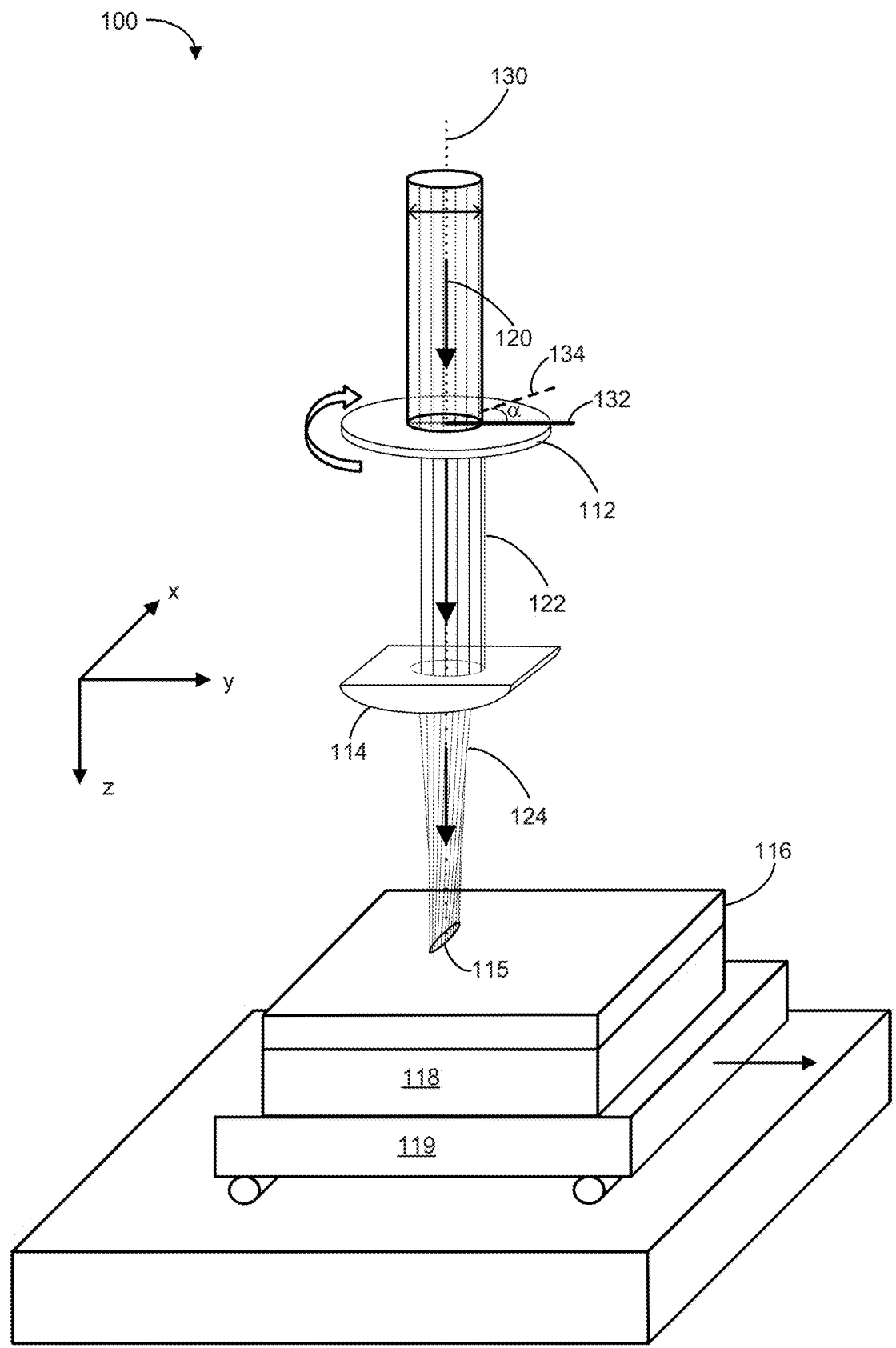
FIGS. 1A and 1B are perspective views of an apparatus for aligning a layer of photopolymers in accordance with some embodiments.

These figures are not drawn to scale unless indicated otherwise.

DETAILED DESCRIPTION

The present disclosure provides a method of aligning a layer of photopolymers that is faster and provides improved precision and/or uniformity of the alignment pattern compared to currently available methods. Faster alignment of photopolymers leads to increased efficiency and productivity in fabrication of optical elements that are in high demand. In accordance with some embodiments, a polarized beam is asymmetrically focused to form a high-aspect-ratio axially asymmetric beam cross-section. A direction of polarization of the beam is rotated while the beam is used to scan a layer of photopolymers to create an alignment pattern therein, allowing for a faster fabrication process compared to a point-by-point scanning and alignment method. Furthermore, precision and/or uniformity of the alignment pattern is improved because the axially asymmetric beam cross-section is able to illuminate a larger area than an axially symmetrical beam (e.g., circular beam having the same width). In some embodiments, using an asymmetrical beam and a raster-scanning method, fewer iterations are required to cover an area of interest, as compared to a circular beam with the same beam width, without sacrificing resolution along the scanning direction. An apparatus for aligning photopolymers used to carry out the method described herein is also disclosed.

Reference is now made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first light projector could be termed a second light projector, and, similarly, a second light projector could be termed a first light projector, without departing from the scope of the various described embodiments. The first light projector and the second light projector are both light projectors, but they are not the same light projector.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 1B:
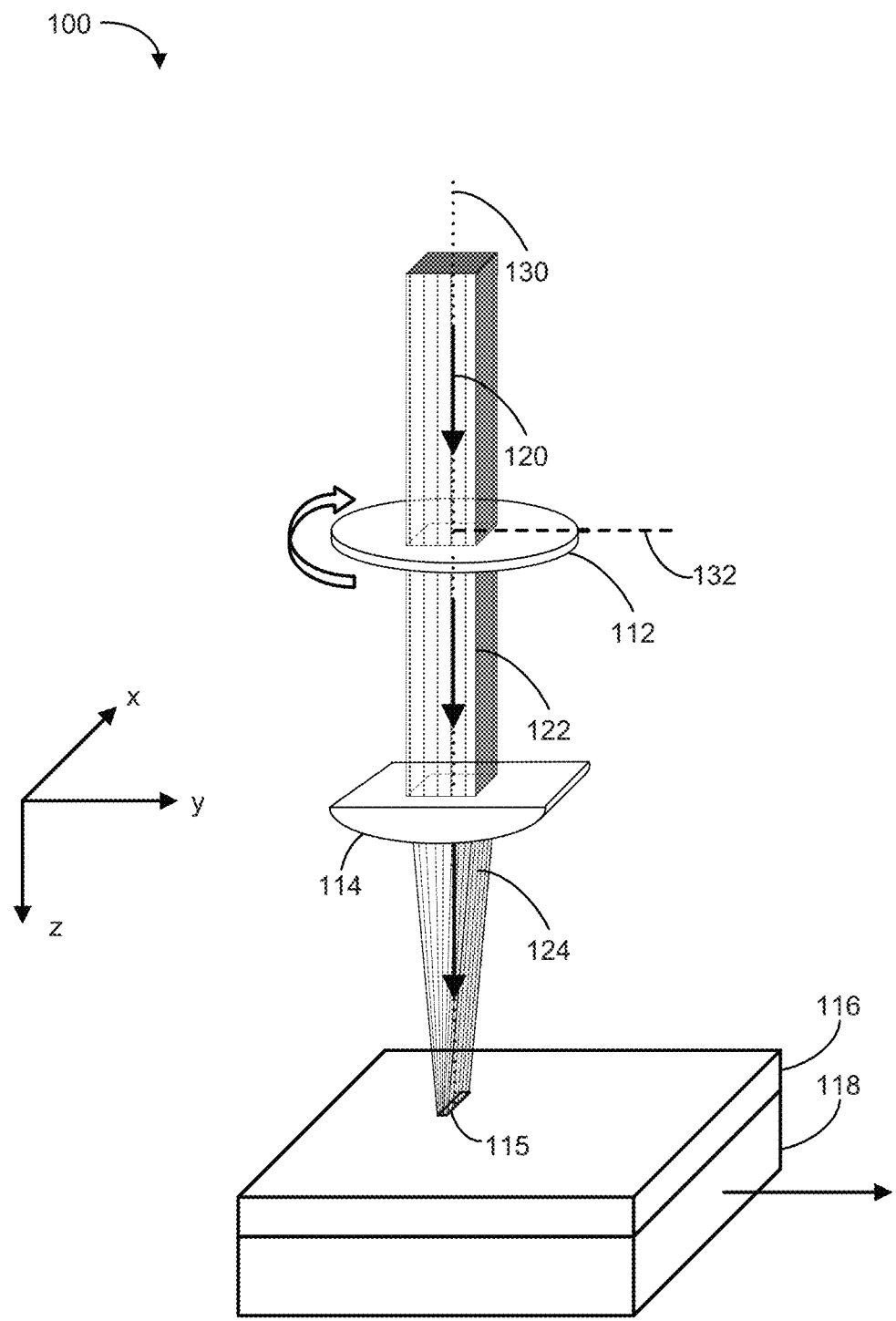

FIGS. 1A and 1B show perspective views of apparatus 100 and 101, respectively, for aligning a layer of photopolymers 116 in accordance with some embodiments. Apparatus 100 includes a first optical element 112 and a second optical element 114. Optical element 112 is configurable to receive incoming light on one side and to output at least a portion of the incoming light having a particular polarization on the other side. In some embodiments, first optical element 112 is a half waveplate. In some embodiments, second optical element 114 has an asymmetrical optical profile or an optical profile that is not axisymmetric. For example, as shown in FIG. 1A, second optical element 114 can be a cylindrical lens or an optical element that provides a similar phase profile. Second optical element is configured to focused light mainly in a single dimension or axis (e.g., the y-axis, as shown in FIG. 1A). Second optical element 114 can also be a polarization volume hologram or a geometric phase lens that has a cylindrical phase profile. In some embodiments, as shown, photoalignment layer 116 is located on a surface of a substrate 118 (e.g., a semiconductor substrate, glass, etc.). In some embodiments, as shown in FIG. 1A, photoalignment layer 116 and/or substrate 118 are optionally located on a translation stage 119 that is capable of movement in at least one of the x-direction and the y-direction.

First optical element 112 is configured to receive incoming light (e.g., ray 120) that has an initial polarization (e.g., ray 120 is a plane-polarized wave having a plane of polarization parallel to the y-z plane) and propagates along an optical axis 130 of the optical element 112 (e.g., the z-axis). Ray 120 is transmitted through first optical element 112. First optical element 112 has a first optical element axis 134 (e.g., fast or slow axis of a half-wave plate), which forms an angle a with a virtual reference axis 132 (e.g., the y-axis) aligned with an initial polarization of the incoming light (e.g., ray 120). The angle a can be changed by rotating first optical element 112 about optical axis 130. Reference axis 132 and first optical element axis 134 are both perpendicular to optical axis 130. After being transmitted through first optical element 112, ray 120 is converted to beam 122 having a polarization direction that forms an angle a with respect to the reference axis. In some embodiments, as shown in FIG. 1A, incoming light (e.g., ray 120) has an initial polarization that corresponds to (e.g., is parallel to) reference axis 132 (e.g., y-axis). The polarization of incoming light is converted to a polarization that is dependent on the orientation of first optical element axis 134. Beam 122 is transmitted from the first optical element 112 to second optical element 114. In some cases, one or both of incoming light (e.g., ray 120) and beam 122 output from the first optical element are collimated beams. In some cases, incoming light (e.g., ray 120) and/or beam 122 has a circular spatial profile (e.g., a Gaussian spatial profile), as shown in FIG. 1A. In some embodiments, incoming light (e.g., ray 120) and/or beam 122 can also be in another beam shape, such as an elliptical beam shape, or a square or rectangular beam shape shown in FIG. 1B. Beam 122 is asymmetrically focused by second optical element 114 to produce beam 124. Beam 124 is focused onto a surface of photoalignment layer 116 and is used to align a portion of the photopolymers in the photoalignment layer. Focused beam 124 illuminates an area or region (e.g., illuminated area or region 115) on the surface of photoalignment layer 116. In some embodiments, illuminated area 115 has an elliptical shape (see FIG. 1A), or a rectangular shape (see FIG. 1B), with an aspect ratio as high as 2,500:1 or above, or even 200,000:1 or above. With such a high aspect ratio, the illuminated area 115 can appear as a line or slit on the surface of photoalignment layer 116. Photopolymers in illuminated area 115 are illuminated by beam 124 and are aligned in a direction that corresponds to the alignment polarization. Thus, the polarization of beam 124 is referred to herein as "alignment polarization").

FIGS. 2A-2D illustrate rotating first optical element 112, so that first optical element axis 134 forms different angles with reference axis 132 while the illuminated area 115 is swept across the photoalignment layer 116 either by moving stage 119 or by steering beam 122, in accordance with some embodiments.

Figure 2A:
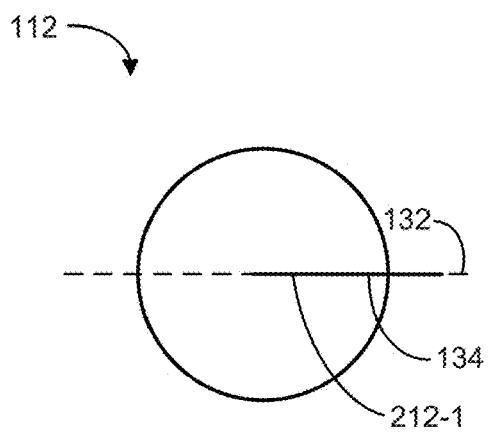
FIG. 2A-2D illustrate rotation of an optical element in accordance with some embodiments.

FIG. 2A shows an overview along the z-axis of first optical element 112, with its first optical element axis 134 forming a first angle 212 axis 132. Incoming light (e.g., ray 120) having the initial polarization 200 is transmitted through first optical element 112 and converted to light (e.g., beam 122) having a first polarization (illustrated by double headed arrow 201-1), corresponding to first angle 212-1. The first polarization 201-1 is in a first direction that forms a first polarization angle al with the reference axis. First polarization angle α1 corresponds to first angle 212-1. In the example shown in FIG. 2A, first optical element axis 134 is parallel to reference axis 132, and the first polarization angle al is zero.

Figure 2B:
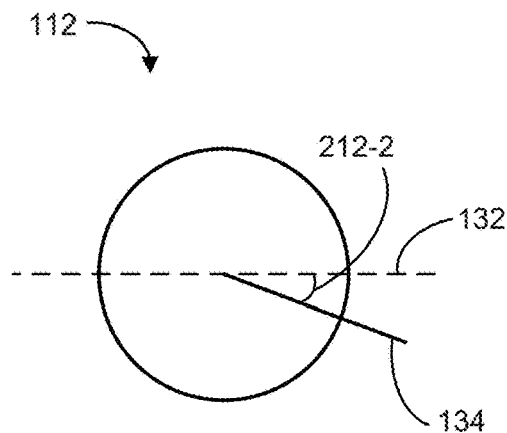

Referring to FIG. 2B, first optical element 112 is rotated such that first optical element axis 134 and reference axis 132 form a second angle 212-2. Incoming light (e.g., ray 120) having the initial polarization (illustrated by double headed arrow 200) and transmitted through first optical element 112 is converted to light (e.g., beam 122) having a second polarization (illustrated by double headed arrow 201-2) distinct from the initial polarization and the first polarization. In some embodiments, the second polarization direction forms angle α2 with the reference axis, which can be determined based on the second angle 212-1 and whether first optical element axis 134 is the fast axis or the slow axis.

Figure 2C:
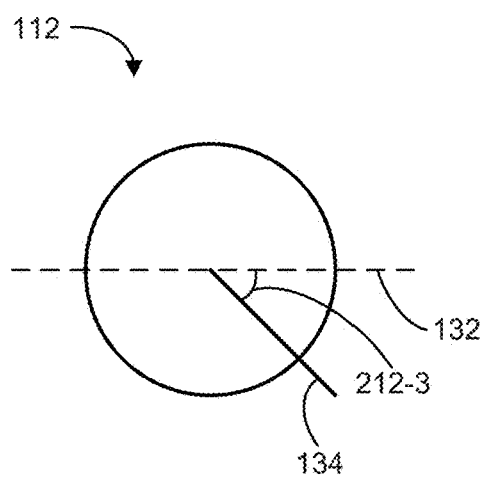

Referring to FIG. 2C, first optical element 112 is rotated such that first optical element axis 134 and reference axis 132 form a third angle 212-3. Incoming light (e.g., ray 120) having the initial polarization 200 and transmitted through first optical element 112 is converted to light (e.g., beam 122) having a third polarization (illustrated by double headed arrow 201-3) distinct from the initial polarization, the first polarization, and the second polarization. In some embodiments, the third polarization direction forms angle α3 with the reference axis, which can be determined based on the third angle 212-3 and whether first optical element axis 134 is the fast axis or the slow axis.

Figure 2D:
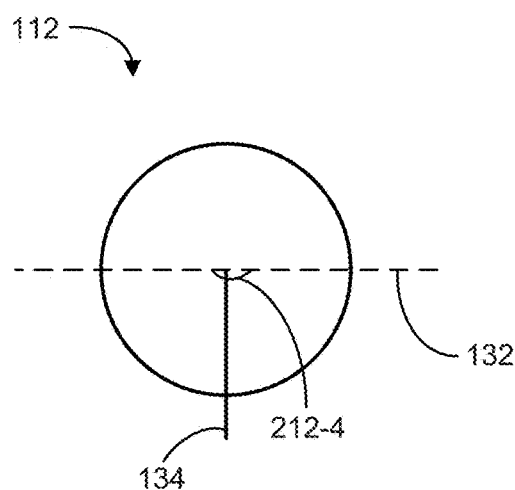

Referring to FIG. 2D, first optical element 112 is rotated such that first optical element axis 134 and reference axis 132 form a fourth angle 212-4. Incoming light (e.g., ray 120) having the initial polarization 200 and transmitted through first optical element 112 is converted to light (e.g., beam 122) having a fourth polarization (illustrated by double headed arrow 201-4) that is the same as the initial polarization and the first polarization. In some embodiments, the fourth polarization direction forms angle a4 with the reference axis, which can be determined based on the fourth angle 212-4 and whether first optical element axis 134 is the fast axis or the slow axis. In the example shown in FIG. 2D, first optical element axis 134 is parallel to reference axis 132, and the fourth polarization angle α4 is π, which in this case is equivalent to zero.

Figure 3:
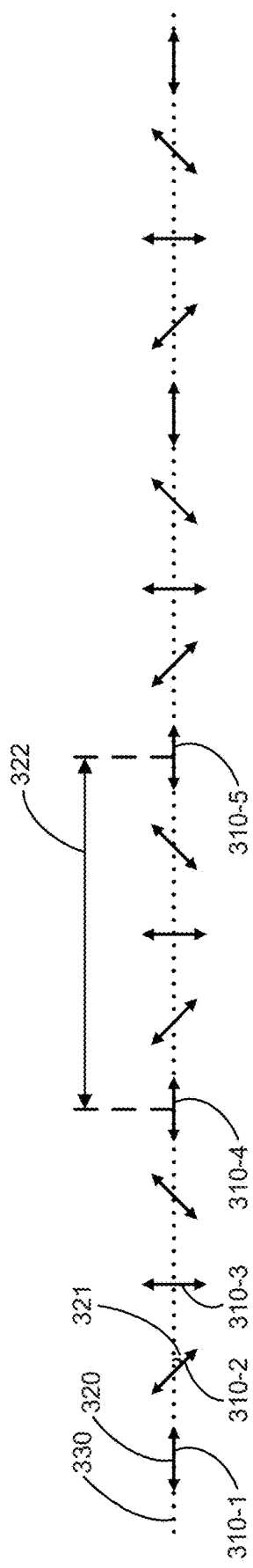
FIG. 3 illustrates orientation of photopolymers in accordance with some embodiments.

FIG. 3 illustrates orientation of a row of aligned photopolymers in accordance with some embodiments, where each double-headed arrow represents a photopolymer and its orientation. For example, arrow 310-1, which is aligned parallel to (e.g., forms an angle 320 that is zero degrees with) axis 330 (which, for example, is parallel to reference axis 132), has a first orientation that corresponds to the first polarization of light. In some cases, arrow 310-1 also represents the direction of the first polarization of light. Arrow 310-2, which forms angle 321 with axis 330, has a second orientation that corresponds to the second polarization of light. Arrow 310-3, which is perpendicular (e.g., orthogonal) to axis 330, has a third orientation that corresponds to a third polarization that is orthogonal to the first polarization (e.g., the polarization of arrow 310-3 is orthogonal to the polarization of arrow 310-1). Arrow 310-4 and arrow 310-5 represent two closest photopolymers that have the same orientation, corresponding to the same polarization of light (e.g., the first polarization). A distance 322 between arrow 310-4 and arrow 310-5 is referred to herein as the pitch of the orientation pattern of the photopolymers along axis 330. In some cases, as shown here, arrow 310-5 is rotated by 180 degrees from arrow 310-4 so the pitch refers to a distance between two closest photopolymers that are rotated by 180 degrees relative to one another. In some cases, the pitch refers to a distance between two closest photopolymers that are rotated by 360 degrees relative to one another (e.g., the distance between arrow 310-1 and arrow 310-5.

FIGS. 4A-4E illustrate a process for aligning a layer of photopolymers in accordance with some embodiments.

Figure 4A:
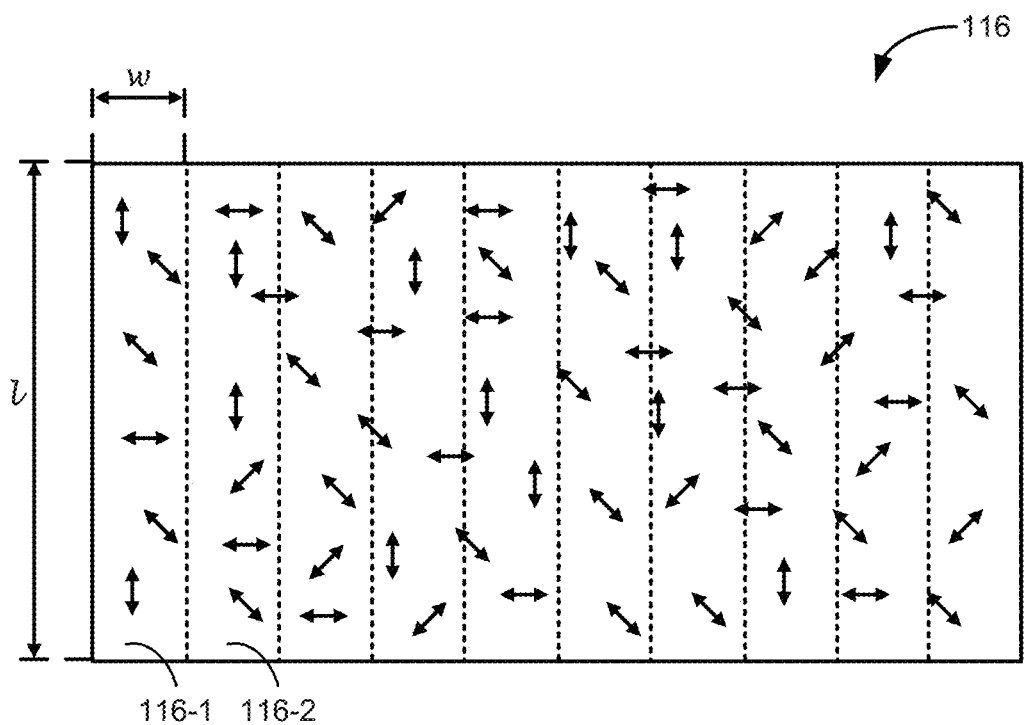
FIGS. 4A-4E illustrate a process of aligning a layer of photopolymers in accordance with some embodiments.

FIG. 4A is a top view of a section of photoalignment layer 116 showing photopolymers (illustrated using double-headed arrows) in photoalignment layer 116 having random orientations before the alignment process. In some embodiments, photoalignment layer 116 includes a plurality of portions, such as a first portion 116-1 and a second portion 116-2. First portion 116-1 has a length l and a width w. In some embodiments, as shown in FIG. 4A, the portions of the plurality of portions are about equally sized. For example, first portion 116-1 and second portion 116-2 are about the same size. In some embodiments, not shown, different portions (e.g., first portion 116-1 and second portion 116-2) may have different sizes. In some embodiments, at the end of the alignment process, the photopolymers in each portion (e.g., first portion 116-1 or second portion 116-2) of the plurality of portions should be in the same or about the same orientation, and the orientation of the photopolymers neighboring portions (e.g., first portion 116-1 and second portion 116-2) are different, as shown in FIG. 4F.

Figure 4B:
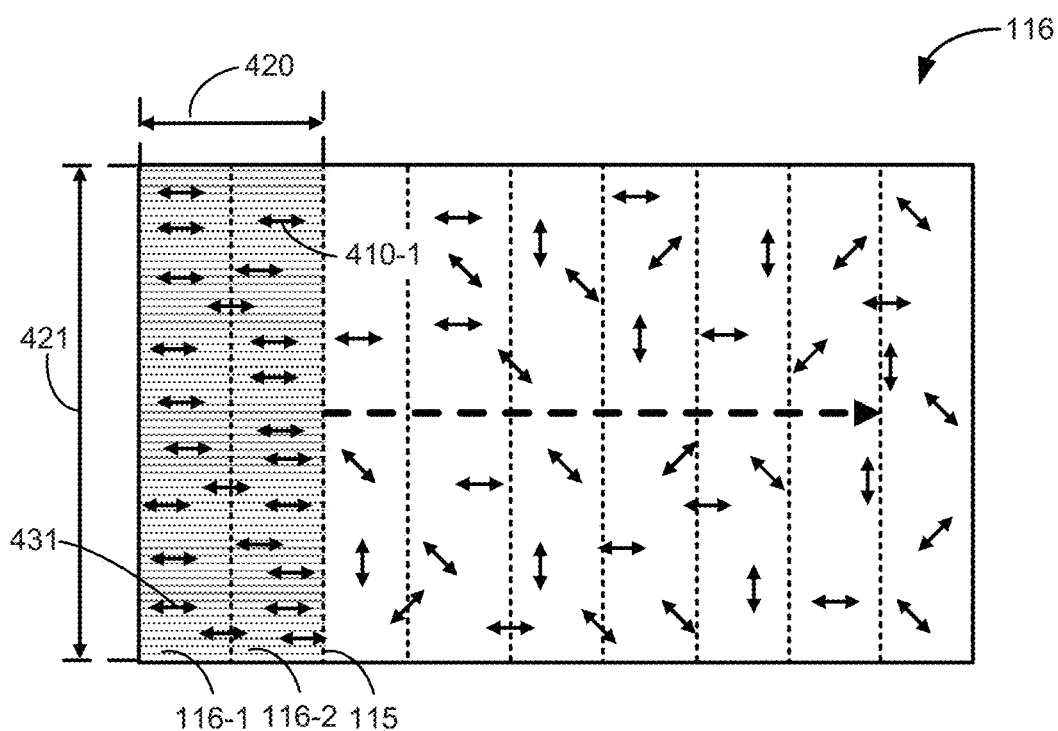

FIG. 4B shows an area or region 115 of photoalignment layer 116 being illuminated by first light (e.g., focused beam 124 having the first polarization). Illuminated area 115 has a width 420 and a length 421. To provide the first light as focused beam 124 having the first polarization, first optical element 112 is set at the first angle 212-1. Illuminated area 115, illuminated by focused beam 124 having the first polarization, includes first portion 116-1 of photoalignment layer 116. Photopolymers of photoalignment layer 116 that are illuminated by the first light (e.g., photopolymers that are within area illuminated 115) are aligned in the first orientation, shown by arrow 410-1, corresponding to the first polarization. Thus, photopolymers that are located in first portion 116-1 are aligned in the first orientation after the first portion is illuminated by the first light. In some embodiments, as shown in FIG. 4B, illuminated area 115 may be larger than the surface area of first portion 116-1 (e.g., width 420 of illuminated area 115 is larger than w). In such cases, photopolymers that are located within illuminated area 115 but not located within first portion 116-1 (e.g., photopolymers in part or all of second portion 116-2) are also illuminated by the first light and become aligned in the first orientation. In some embodiments, length 421 of illuminated area 115 may be the same, or larger than length l of first portion 116-1. In some embodiments, width 420 of illuminated area 115 may be the same, or larger than width w of first portion 116-1.

Figure 4C:
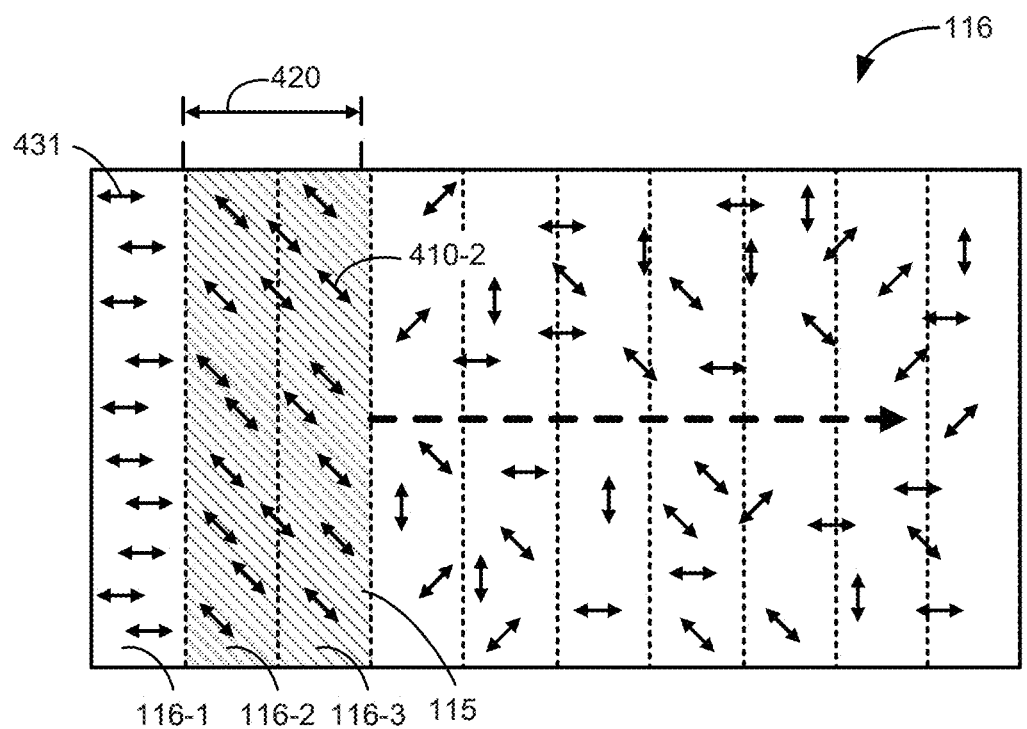

FIG. 4C show arrows 431, which represent photopolymers in first portion 116-1 of photoalignment layer 116 that are aligned to have the first orientation corresponding to the first polarization of light. FIG. 4C also shows that illuminated area 115 of photoalignment layer 116, illuminated by second light (e.g., focused beam 124 having the second polarization), has now moved away from first portion 116-1 and includes at least second portion 116-2 of photoalignment layer 116. To provide focused beam 124 as second light having the second polarization distinct from the first polarization, first optical element 112 is rotated to the second angle 212-2. As shown, photopolymers on photoalignment layer 116 that are illuminated by the second light have the second orientation corresponding to the second polarization. Photopolymers in second portion 116-2 of photoalignment layer 116 that may have previously been aligned in the first orientation (e.g., by the first light) are re-aligned (e.g., re-arranged, re-oriented) by the second light to have the second orientation. In some embodiments, as shown, illuminated area 115, corresponding to the area illuminated by focused beam 124 with the second polarization, may have a size (e.g., width 420, length 421) that is larger than the size of second portion 116-2. Thus, some photopolymers that are located outside of second portion 116-2 (e.g., photopolymers in part or all of a third portion 116-3) are also illuminated by the second light and are aligned in the second orientation. In some embodiments, illuminated area 115 is moved along a direction shown in FIGS. 4B-4E in order to illuminate the different portions of this section of photoalignment layer 116 with light of various polarizations to create a desired alignment pattern for the photopolymers (e.g., the alignment pattern shown in FIG. 4F). Illuminated area 115 can be moved across the surface of photoalignment 116 by moving photoalignment layer 116 or by steering cylindrical beam 124, as described in further detail below.

Figure 4D:
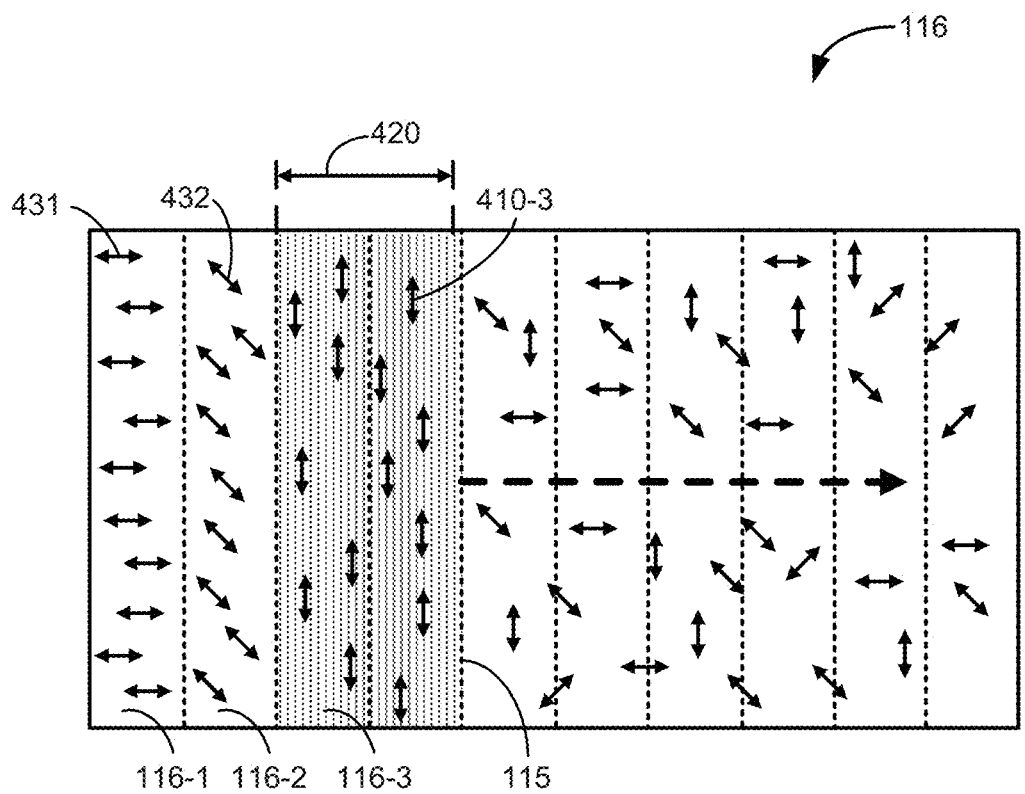

FIG. 4D shows that photopolymers in first portion 116-1 of photoalignment layer 116 have the first orientation, represented by arrows 431, corresponding to the first polarization of light. FIG. 4D also shows that photopolymers in second portion 116-2 have the second orientation, represented by arrows 432, corresponding to the second polarization of light. FIG. 4D also shows focused beam 124, having the third polarization, shone onto illuminated area 115, which has moved away from second portion 116-2 and further away from first portion 116-1 to now include third portion 116-3. Thus, focused beam 124 having the third polarization does not illuminate first portion 116-1 and second portion 116-2. To provide focused beam 124 having the third polarization as third light, first optical element 112 is rotated to the third angle 212-3. Photopolymers that are illuminated by the third light are aligned to have the third orientation. In some embodiments, photopolymers in third portion 116-3 that may previously have been aligned in the first orientation or the second orientation, by the first light or the second light, respectively, are re-aligned (e.g., overwritten) to have the third orientation, by the third light.

Figure 4E:
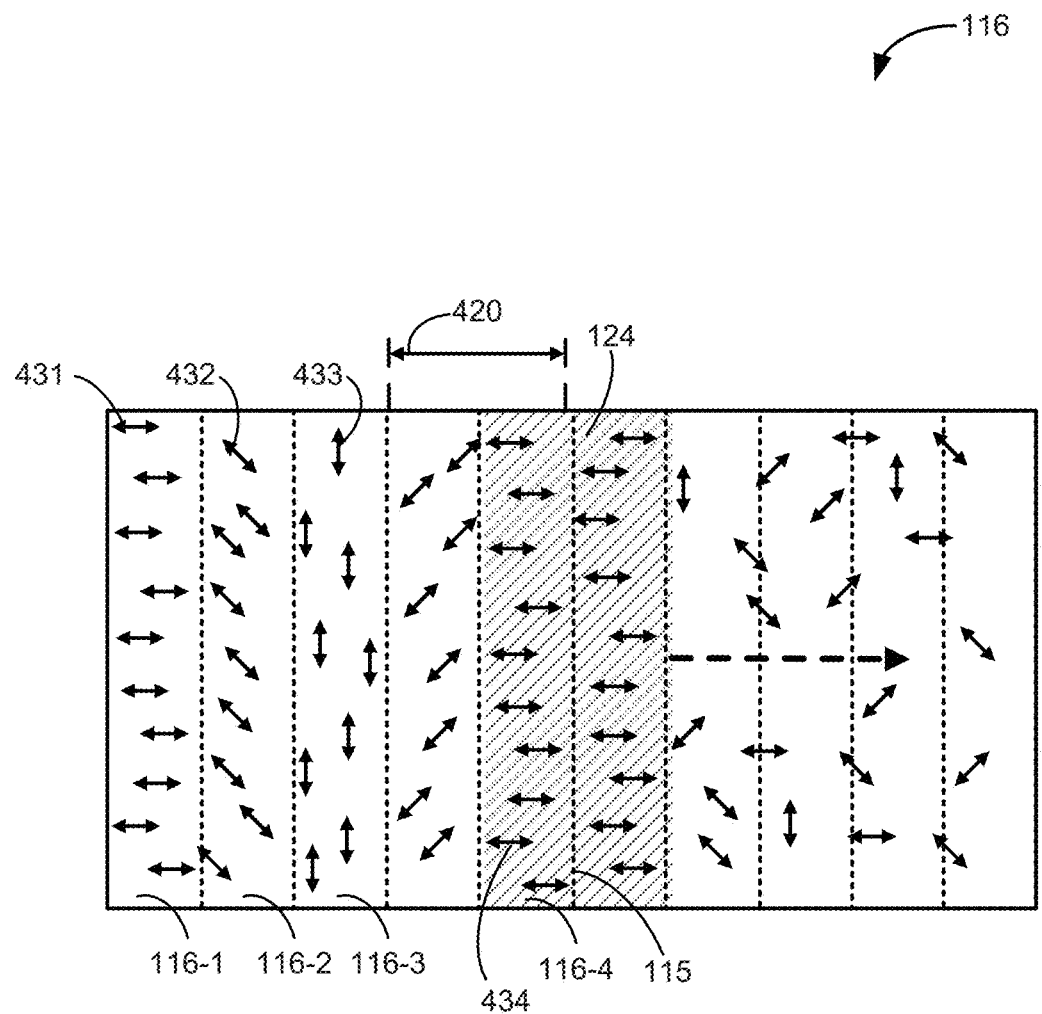
Figure 4F:
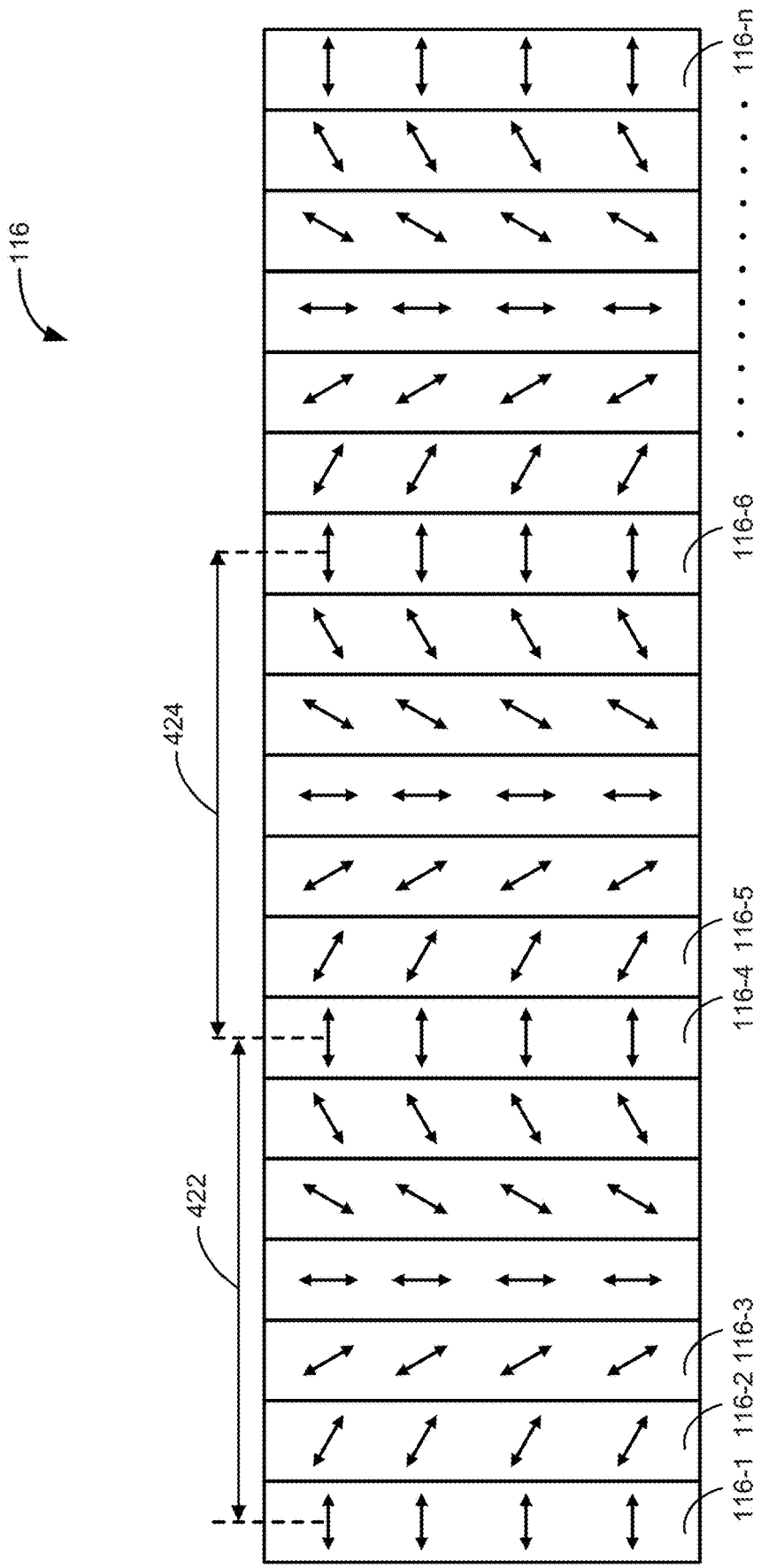
FIG. 4F illustrates an example of a layer of photopolymers aligned by the process shown in FIGS. 4A-4E.

FIG. 4E shows photopolymers in first portion 116-1 have the first orientation, represented by arrow 431, corresponding to the first polarization of light. Photopolymers in second portion 116-2, distinct from first portion 116-1, have a second orientation, represented by arrows 432, corresponding to the second polarization of light, and photopolymers in the third portion, distinct from first portion 116-1 and second portion 116-2, have a third orientation, represented by arrows 433, corresponding to the third polarization of light. FIG. 4E also shows that illuminated area 115 of photoalignment layer 116, illuminated by fourth light (e.g., focused beam 124 having the fourth polarization), has now moved to include at least fourth portion 116-4 of photoalignment layer 116. To provide focused beam 124 as fourth light, first optical element 112 is rotated to the fourth angle 212-4. As shown, photopolymers on photoalignment layer 116 that are illuminated by the fourth light have the fourth orientation corresponding to the fourth polarization. The polarization of focused beam 124 is changed, by rotating first optical element 112, as focused beam 124 is moved across photoalignment layer 116 (e.g., illuminated area 115 is displaced across a surface of photoalignment layer 116). The direction that illuminated area 115, illuminated by focused beam 124, is moved across photoalignment layer 116 is shown by the dashed arrow in FIGS. 4B-4E.

FIG. 4F illustrates an example of a layer of photopolymers aligned by the alignment process described above with respect to FIGS. 4A-4E. The alignment pattern of the orientations of photopolymers in photoalignment layer 116, as shown in FIG. 4F, has a first pitch 422 and a second pitch 424. In some embodiments, as shown in FIG. 4F, first pitch 422 and second pitch 424 are the same, although first pitch 422 and second pitch 424 in some cases can be different.

Figure 5C:
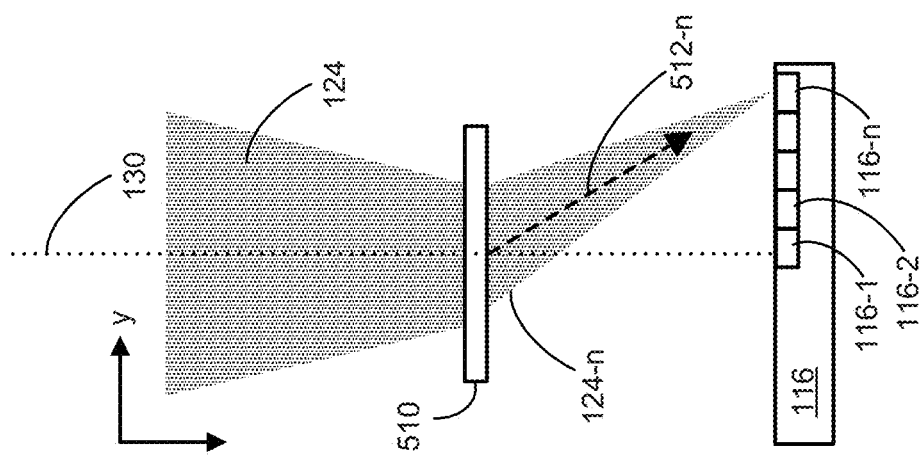
FIGS. 5A-5C illustrate beam steering in accordance with some embodiments.
Figure 5B:
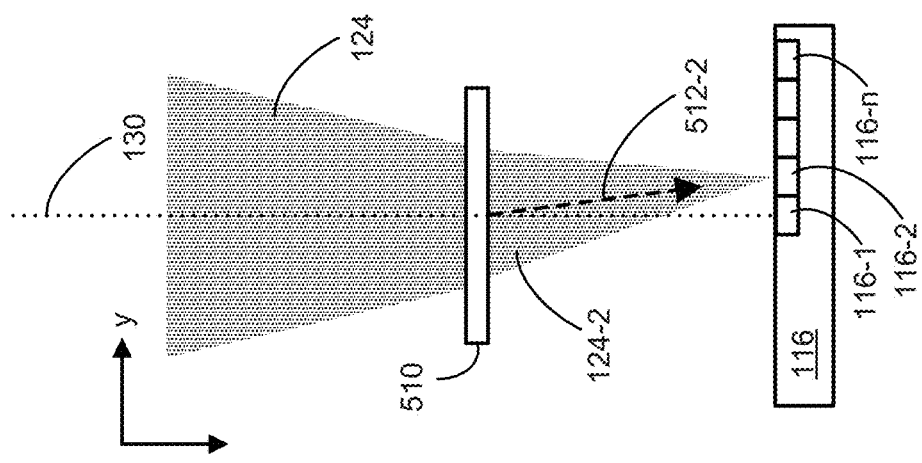
Figure 5A:
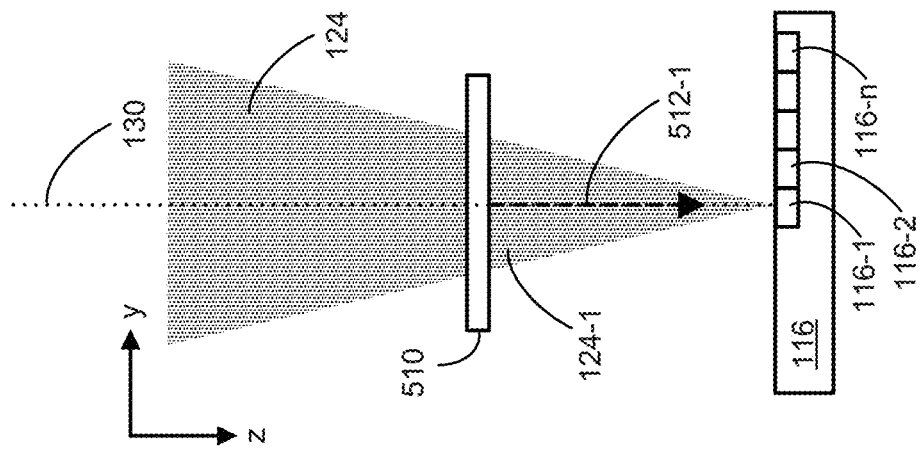

In some embodiments, the area or region illuminated by beam 124 is moved across the photo-alignment layer by moving the stage 119 or by steering beam 124, or both. FIGS. 5A-5C illustrate beam steering in accordance with some embodiments.

FIG. 5A shows beam 124 is steered in a first direction 512-1 by beam steering module 510 so that beam 124-1 is focused onto at least first portion 116-1 of photoalignment layer 116. FIG. 5B shows beam 124 is steered in a second direction 512-2 by beam steering module 510 so that beam 124-2 is focused onto at least second portion 116-2 of photoalignment layer 116. FIG. 5C shows beam 124 is steered in an nth direction 512-n by beam steering module 510 so that beam 124-n is focused onto at least nth portion 116-n of photoalignment layer 116. Beam steering module 510 is optional since in some cases, photoalignment layer 116 can be moved in order to move illuminated area 115, illuminated by focused beam 124. Although beam steering module 510 is currently shown to be along optical axis 130, beam steering module 510 can be located in a different location than shown. Beam steering module 510 may steer the beam by diffraction, reflection, and/or refraction. For example, beam steering module 510 may include one or more of a grating, a mirror, a lens, and/or an adjustable electro-optic component.

For example, the focused first light illuminates the first portion of the layer of photopolymers while the layer of photopolymers is at the first position (e.g., focused beam 124 having a first polarization is focused onto at least first portion 116-1 of photoalignment layer 116 when photoalignment layer 116 is in the first position). Subsequent to illuminating the first portion 116-1 of the layer of photopolymers 116 with the focused first light, the layer of photopolymers 116 is moved from the first position to the second position so that the focused second light illuminates the second portion 116-2 of the layer of photopolymers 116 while the layer of photopolymers 116 is at the second position (e.g., photoalignment layer 116 is moved in the x-y plane so that focused beam 124 having a second polarization is focused onto at least second portion 116-2 of photoalignment layer 116). In some embodiments, photoalignment layer 116 is moved before focused beam 124, having a second polarization, is focused onto at least second portion 116-2 of photoalignment layer 116. In some cases, focused beam 124 having a second polarization is focused onto at least second portion 116-2 and does not illuminate first portion 116-1. In some embodiments, photoalignment layer 116 can be placed on a translation stage that is movable in at least one direction (such as the y-direction). Photoalignment layer 116 can be moved by moving the translation stage along a direction perpendicular to optical axis 130 (e.g., the stage can be moved along a direction of the xy-plane). In some embodiments, moving of photoalignment layer 116 is continuous. In some embodiments, moving of photoalignment layer 116 is discrete. In some embodiments, moving the position of photoalignment layer 116 relative to the position of the focused light includes moving the stage. In some embodiments, when photoalignment layer 116 is located on a surface of a substrate (e.g., substrate 118), substrate 118 may be moved, as described above, in order to move photoalignment layer 116.

In some embodiments, the method described herein can be repeated for multiple portions of the layer of photopolymers in a raster-scanning process.

FIGS. 6A-6D illustrate a raster-scanning process for aligning a layer of photopolymers in accordance with some embodiments. The process shown in FIGS. 6A-6D, includes the process described above with respect to FIGS. 4A-4E. The dashed arrows in FIGS. 6A-6D indicate the path of the raster-scan (e.g., the path of illuminated area 115 moving on a surface of photoalignment layer 116). The raster-scanning pattern shown allows the photopolymers to be aligned without turning off or blocking the alignment beam (e.g., focused beam 124). Illuminated area 115 has a high aspect ratio, as discussed above, and thus requires fewer iterations in the raster scanning process, as compared to conventional alignment process using a circular beam with the same resolution. Thus, the method described herein, which uses a focused beam 114 to align a layer of photopolymers, provides a fast and efficient process for aligning photopolymers without sacrificing resolution.

Figure 6A:
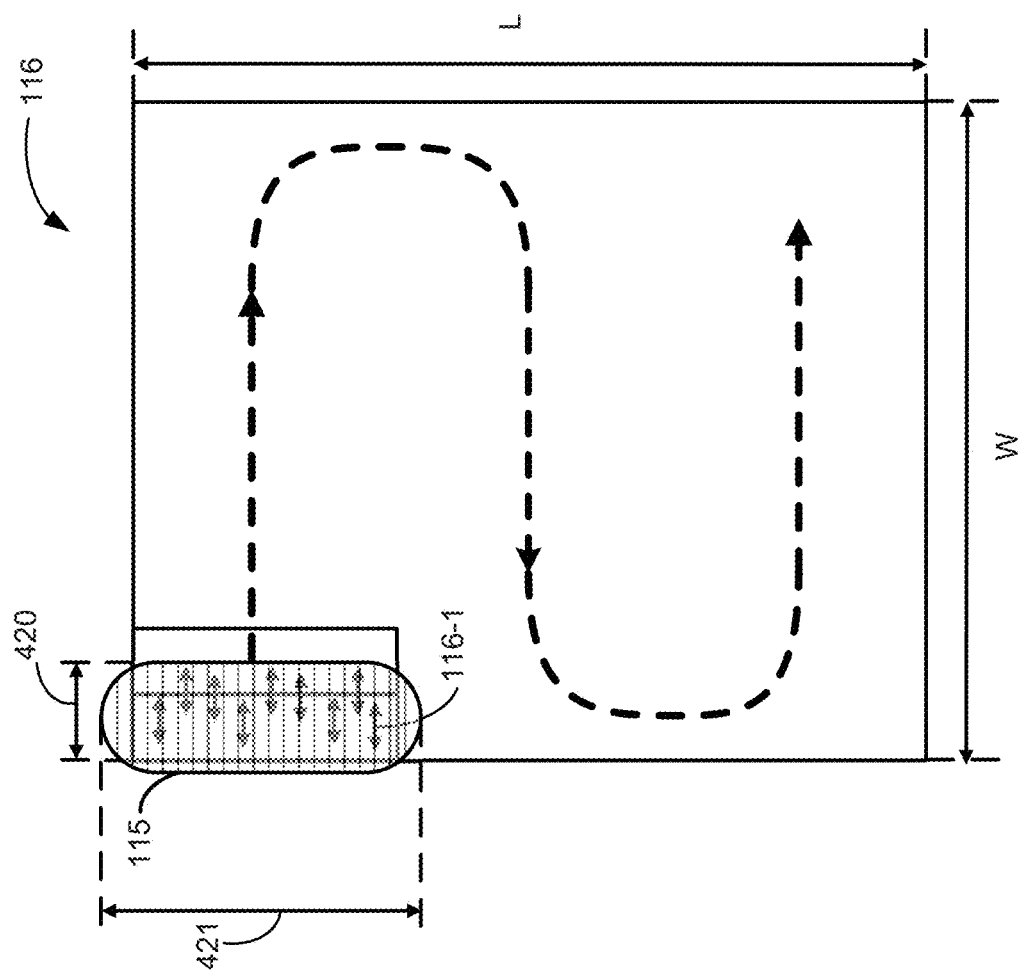
FIGS. 6A-6D illustrate a raster-scanning process of aligning a layer of photopolymers in accordance with some embodiments.
Figure 6C:
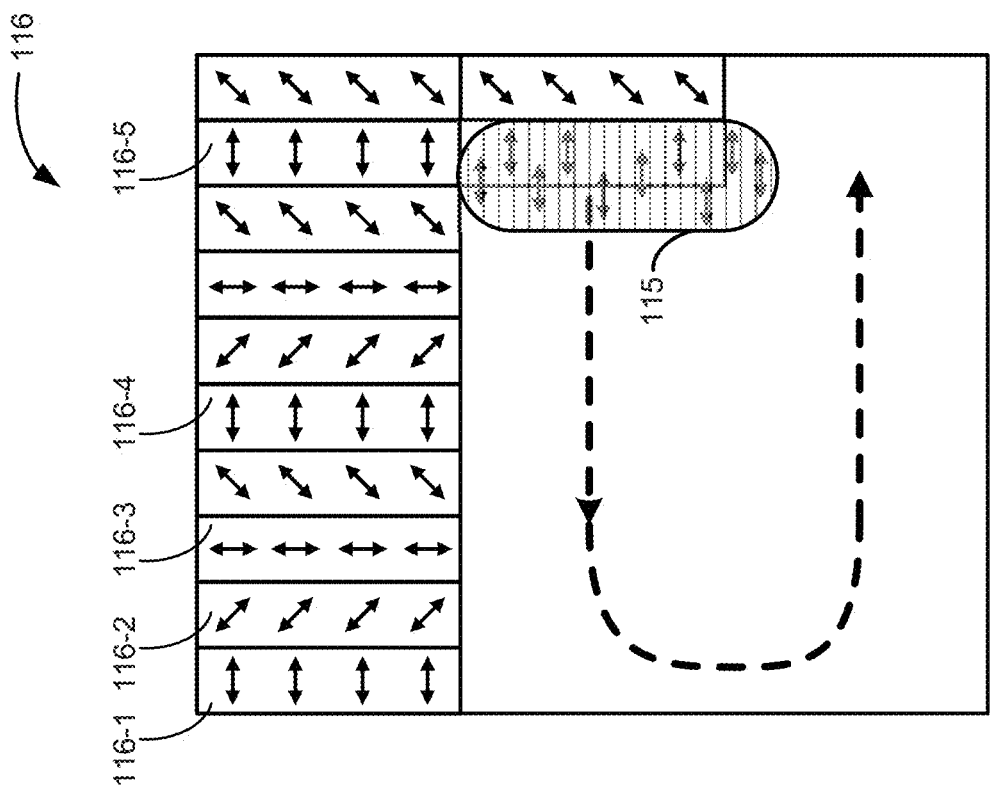
Figure 6B:
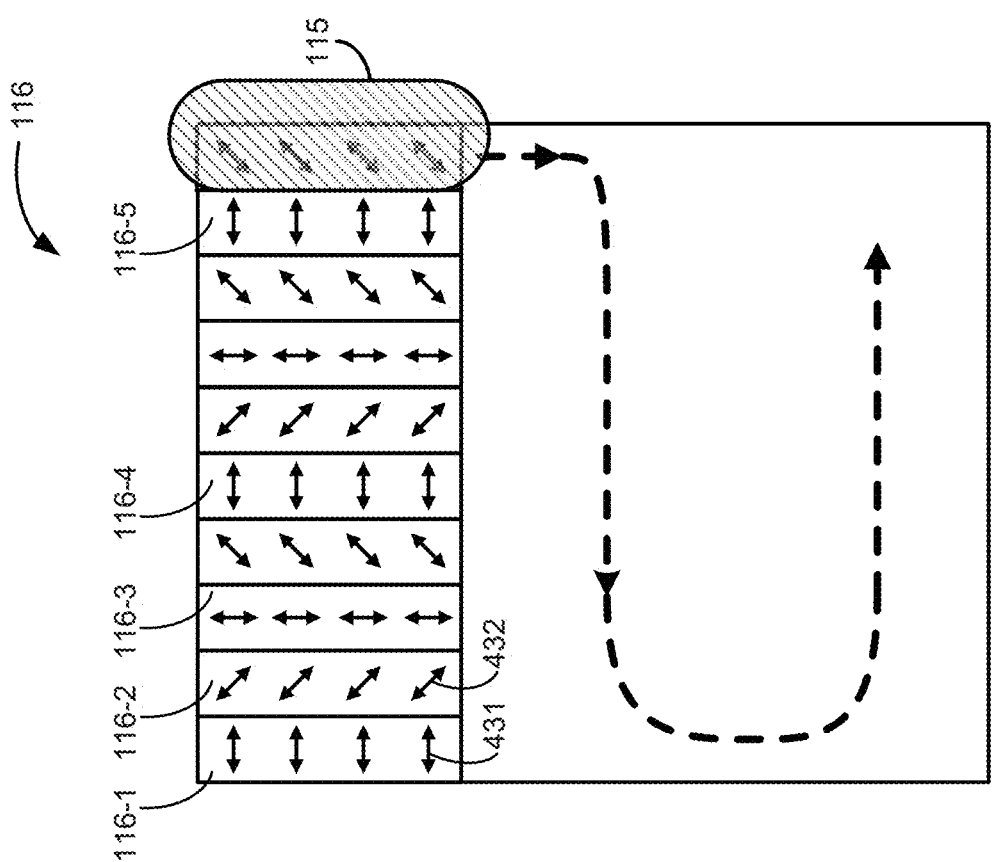
Figure 6E:
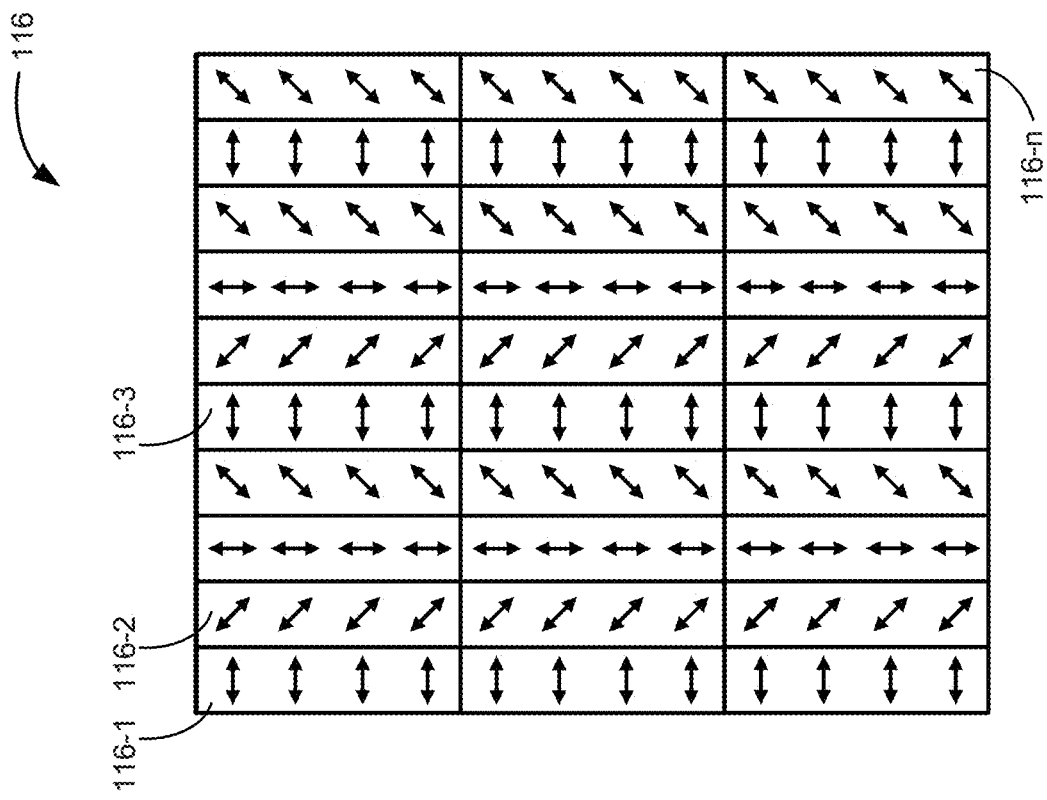
FIG. 6E illustrates a layer of photopolymers aligned by the process shown in FIGS. 6A-6D.
Figure 6D:
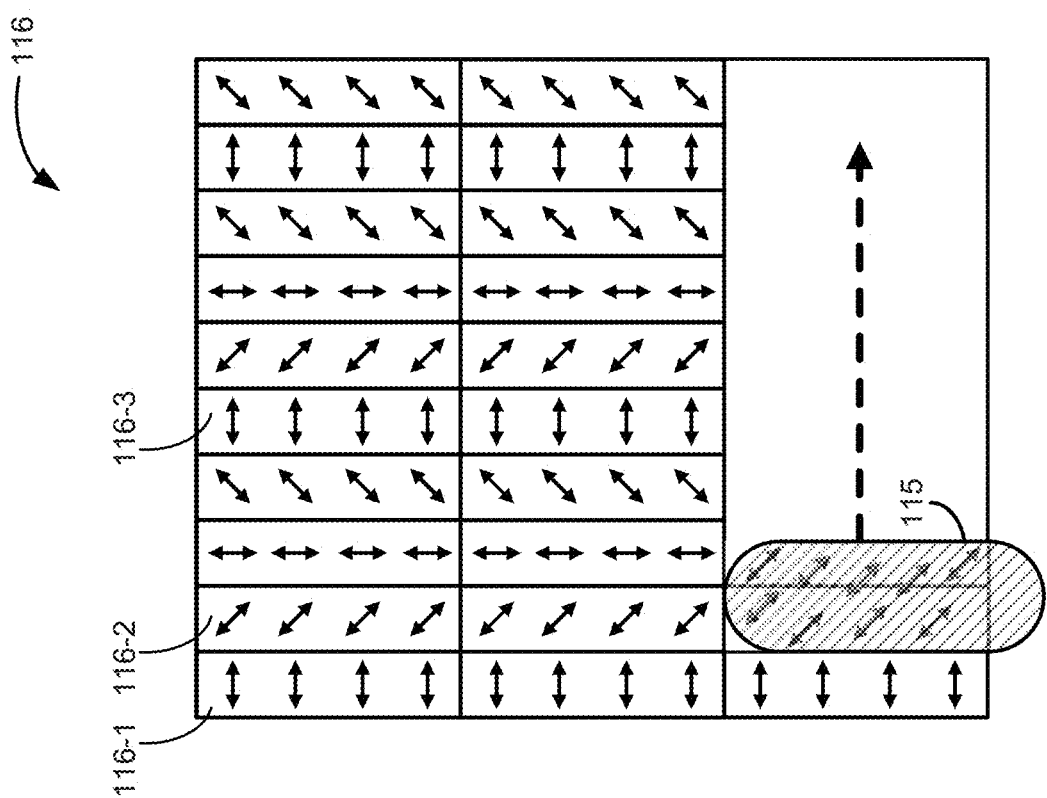

FIG. 6E illustrates a layer 116 of photopolymers after the completion of the raster-scanning process in accordance with some embodiments. A photoalignment layer 116 with photopolymers that are aligned using the raster-scanning method described with respect to FIGS. 6A-6D is shown.

FIGS. 7A-7D illustrate a raster-scanning process of aligning a layer 116 of photopolymers in accordance with some embodiments. The process shown in FIGS. 7A-7D, includes the process described above with respect to FIGS. 4A-4E. The dashed arrows 711, 712, 713 in FIGS. 7A-7D indicate the paths (e.g., movement) of illuminated area 115 during the raster-scan. As shown in FIGS. 7A-7D, instead of one continuous path, the raster scanning process illustrated in FIGS. 7A-7D uses multiple paths (e.g., paths 711, 712, 713) to move illuminated area 115 across the surface of photoalignment layer 116 by moving photoalignment layer 116 relative to focused beam 124 or by steering focused beam 124. In some embodiments, after illuminated area 115 has moved to the end of one path (e.g., path 711), focused beam 124 is turned off or blocked briefly, allowing photoalignment layer 116 to be moved or for beam steering module 510 to be adjusted so that illuminated area 115 will start to move along the next path (e.g., path 712) when focused beam 124 is turned back on. This raster-scanning process requires that the beam (e.g., focused beam 124) is turned "off", blocked, or steered away from photoalignment layer 116 while the position of photoalignment layer 116 or the direction of beam 124 is adjusted during the transition between two consecutive scanning paths (i.e., after illuminated area 115 reaches the end of one path (e.g., path 711) and before illuminated area 115 starts to move along the next path (e.g. path 712)).

Figure 7A:
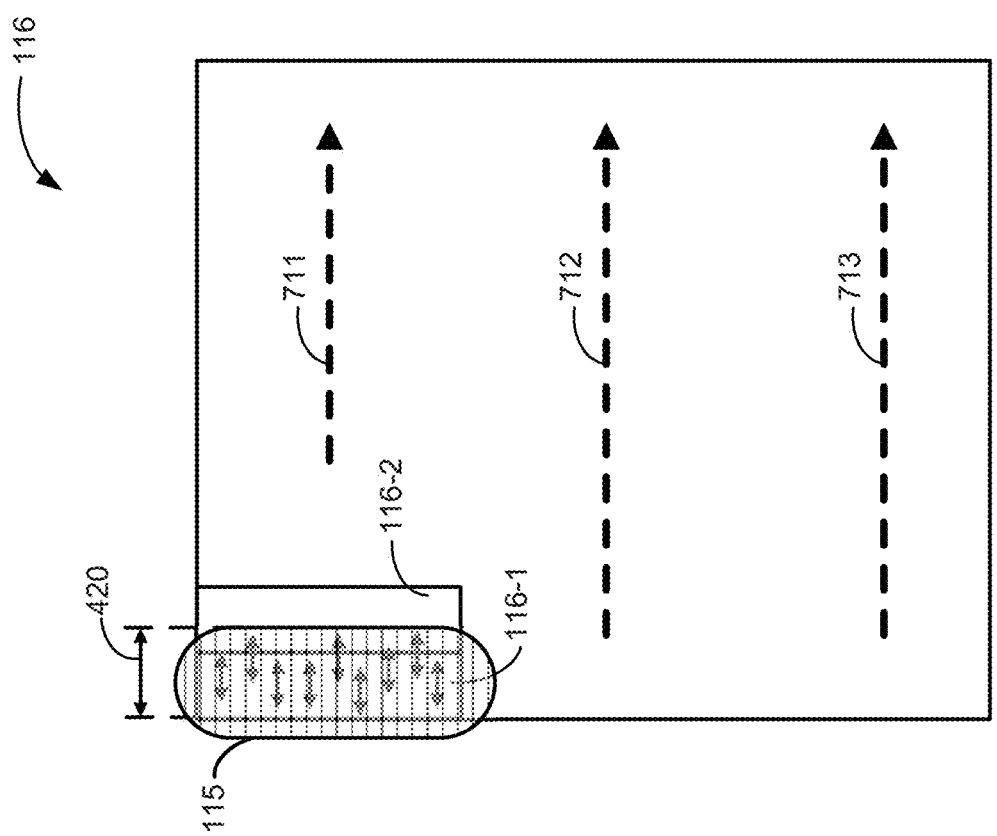
FIGS. 7A-7D illustrate a raster-scanning process of aligning a layer of photopolymers in accordance with some embodiments.
Figure 7C:
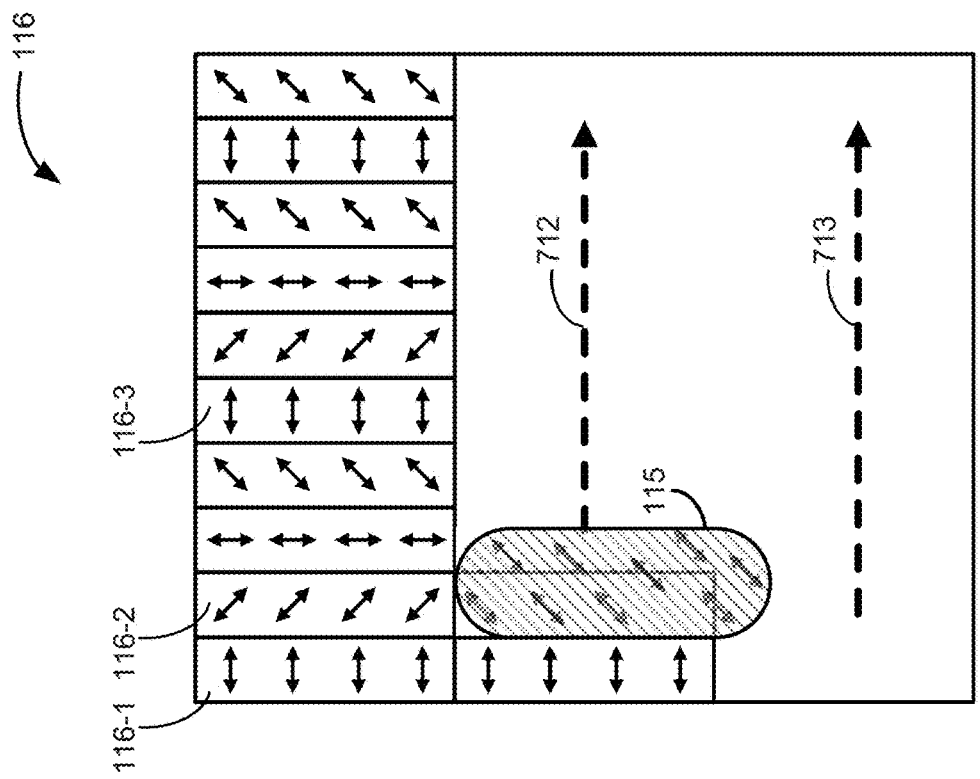
Figure 7B:
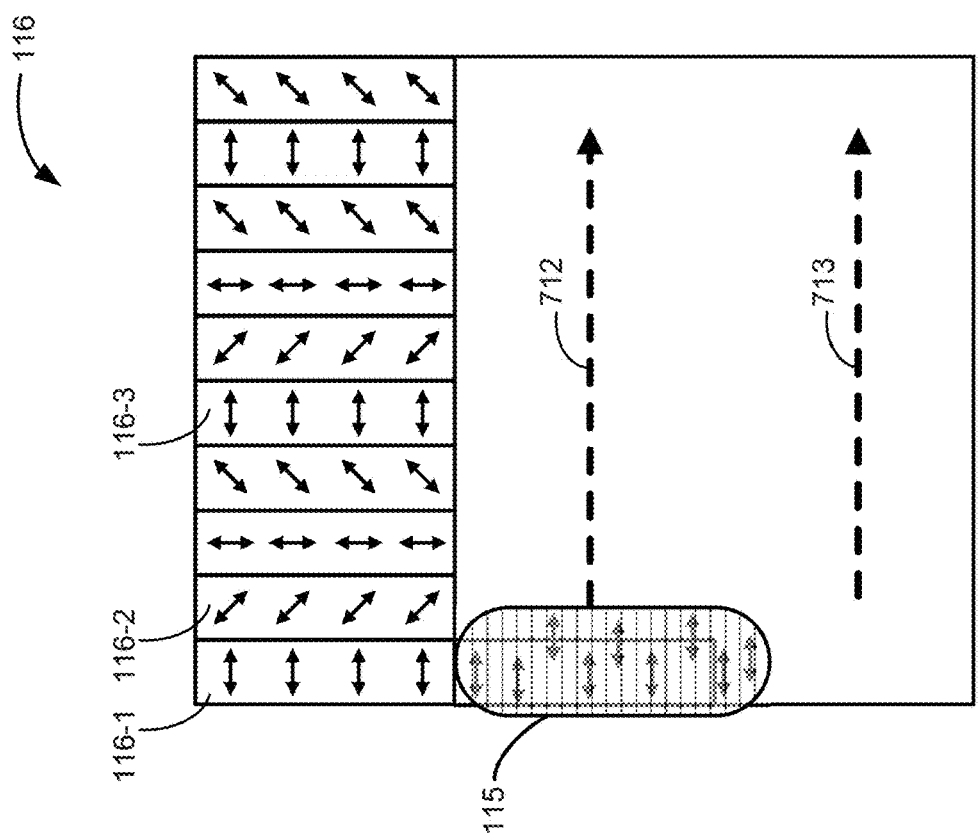
Figure 7E:
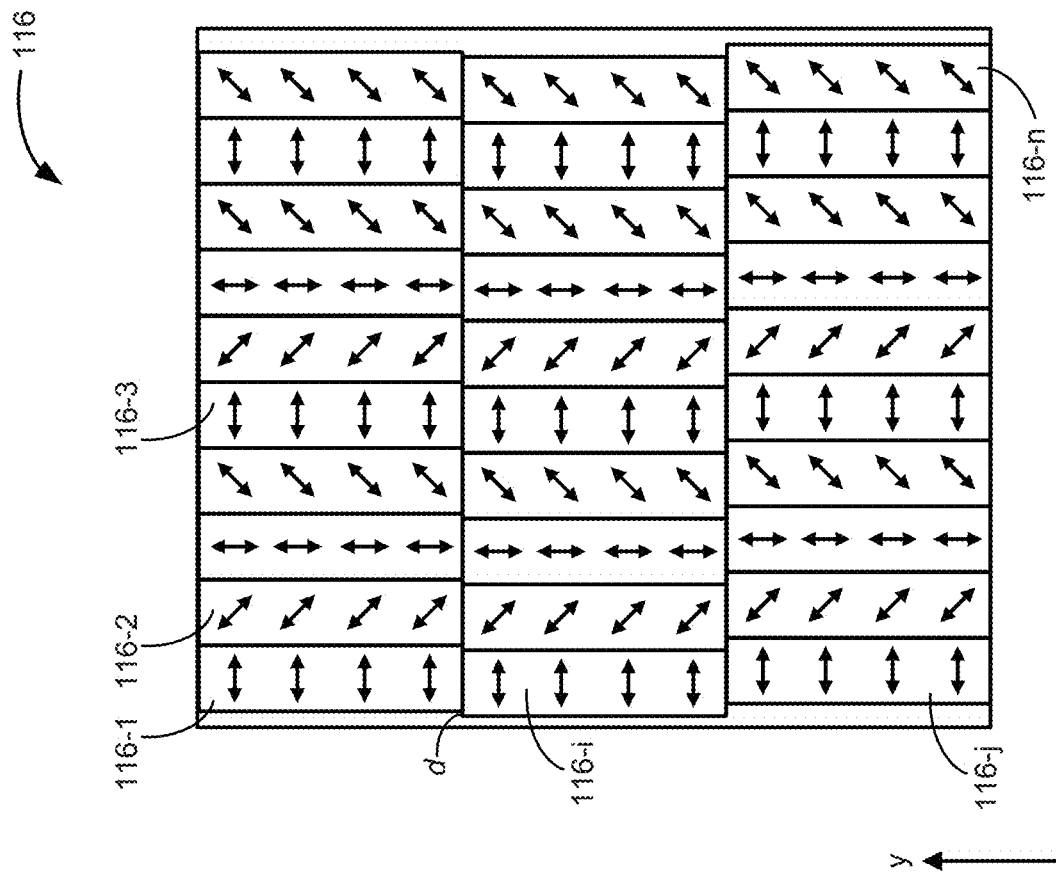
FIG. 7E illustrates a layer of photopolymers aligned by the process shown in FIGS. 7A-7D.
Figure 7D:
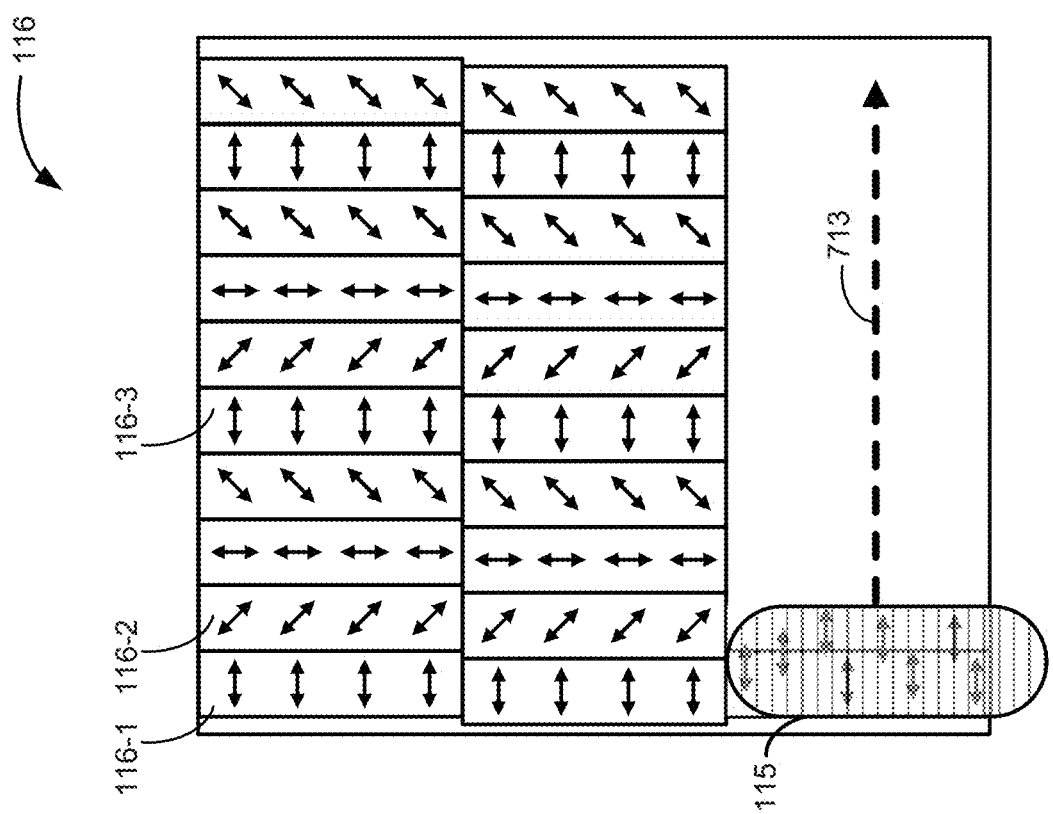
Figure 8A:
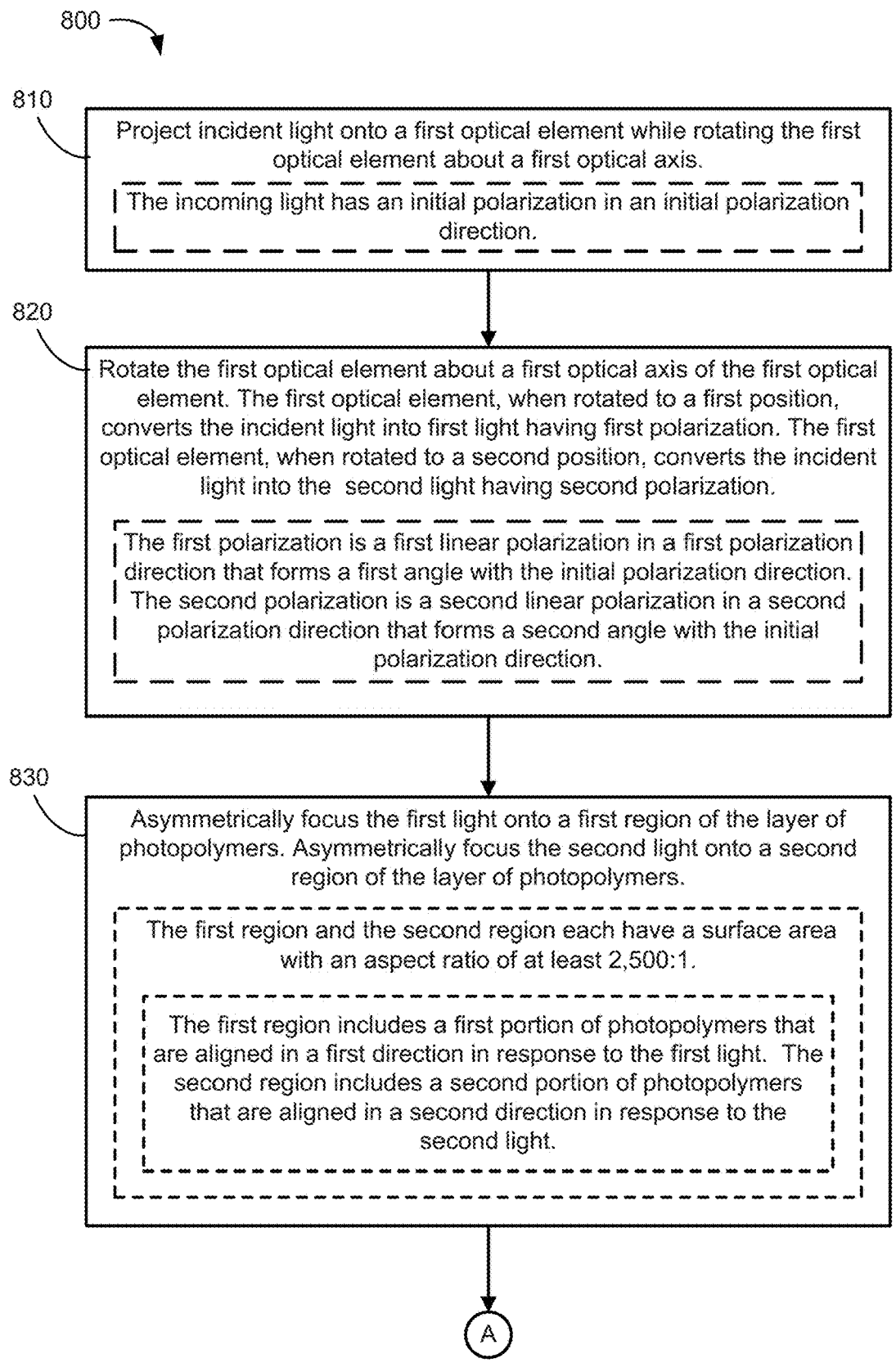
FIGS. 8A-8E illustrate a flow chart representation of a method of aligning a layer of photopolymers in accordance with some embodiments.
Figure 8B:
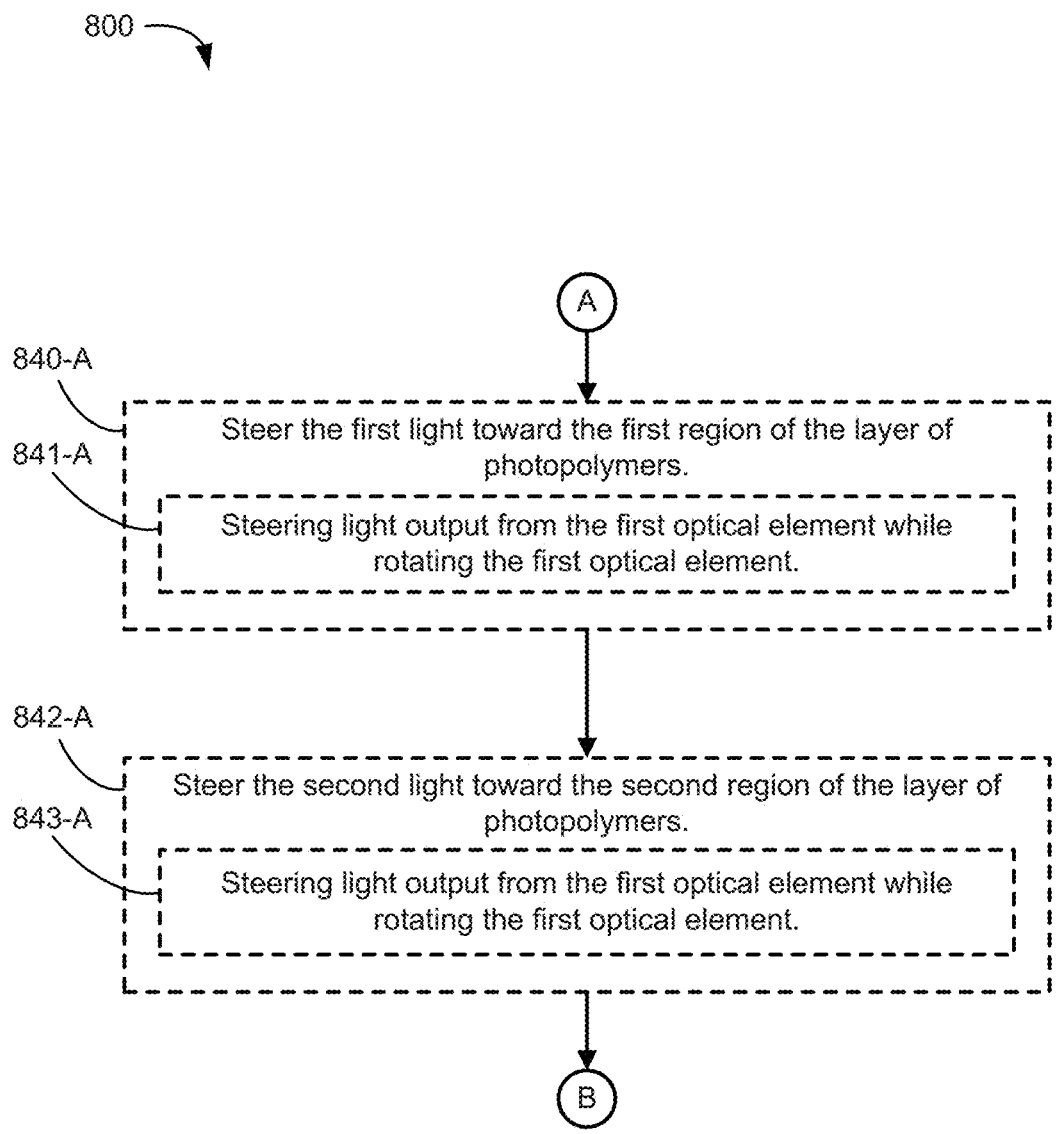
Figure 8C:
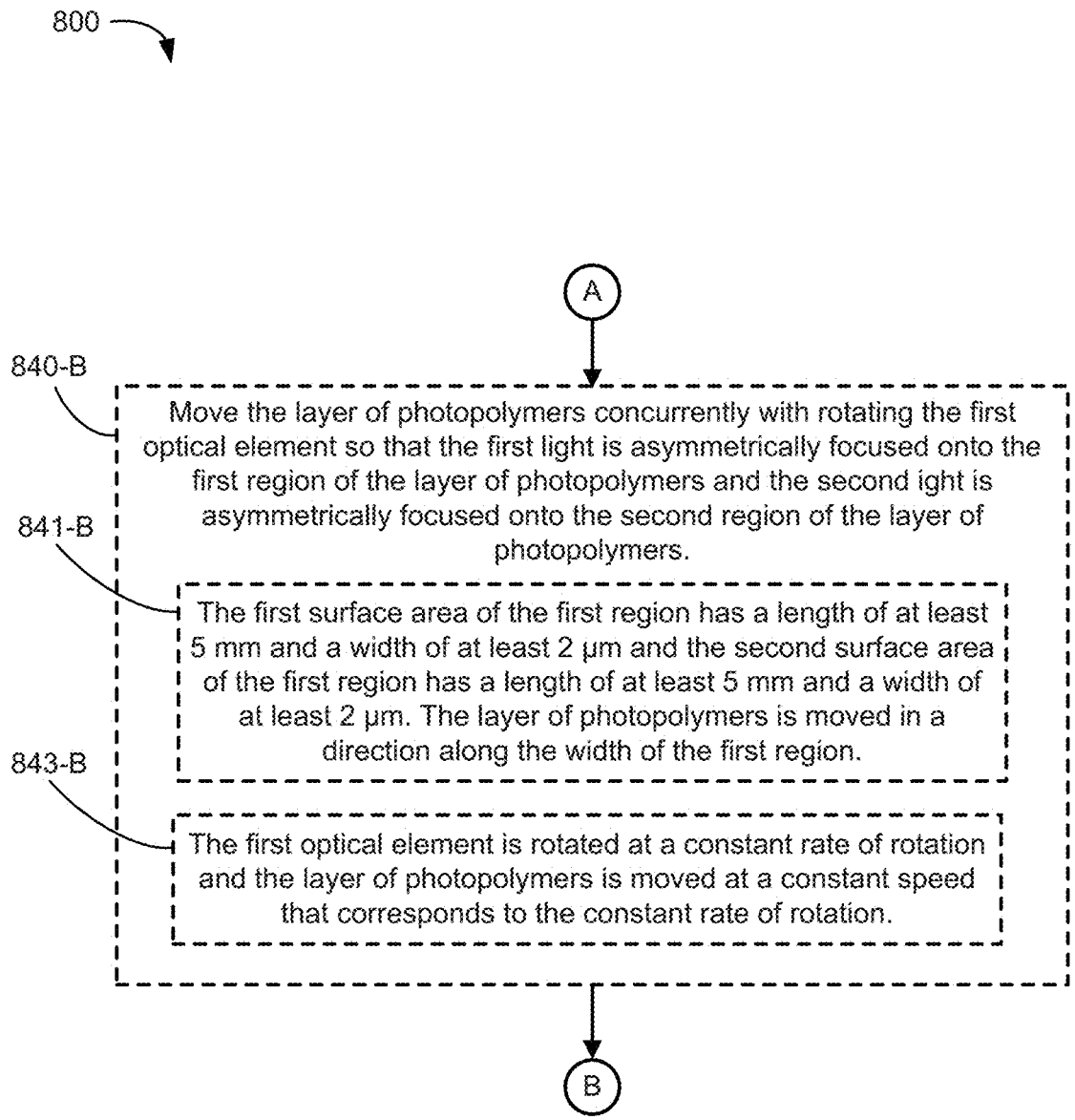
Figure 8D:
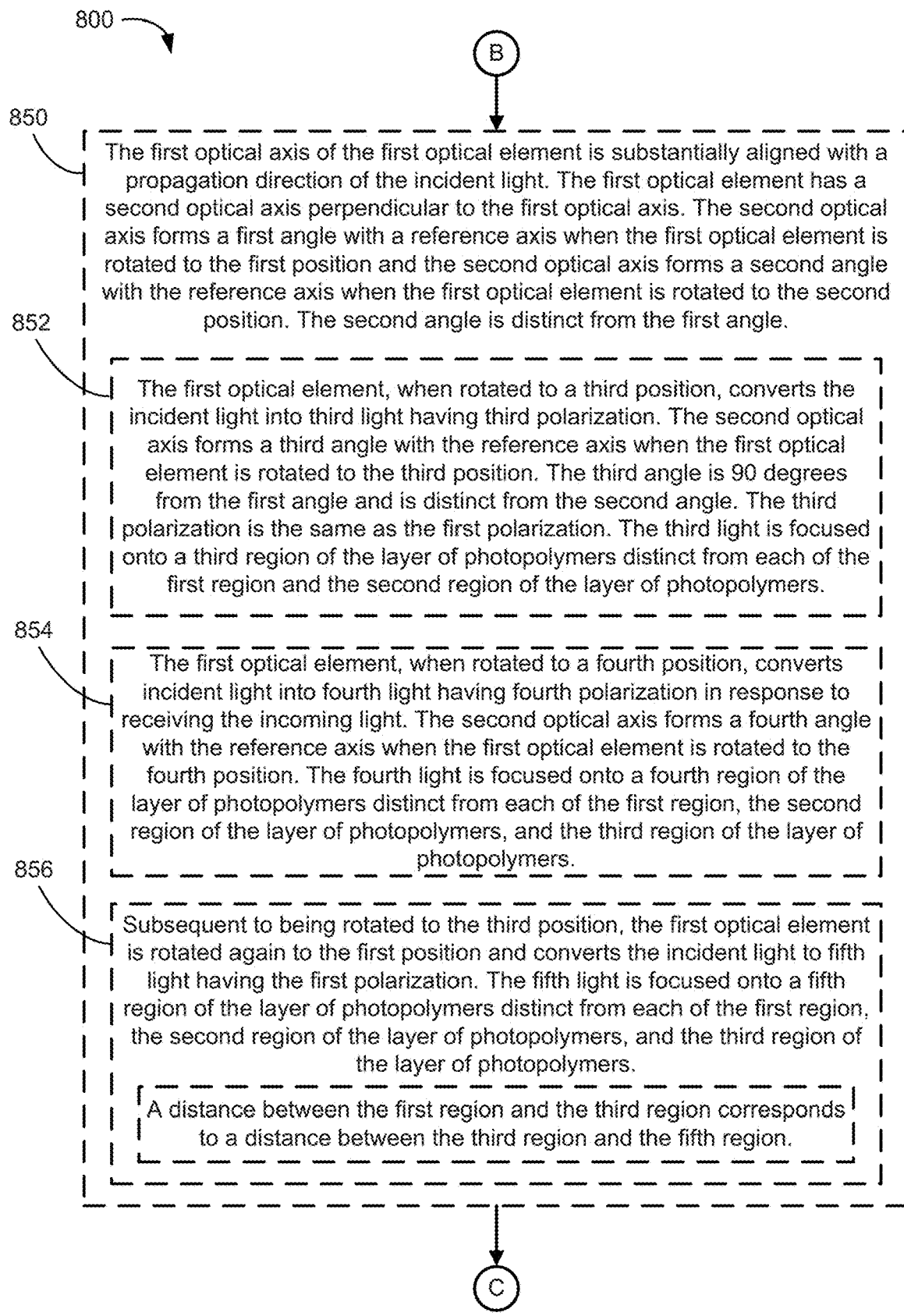
Figure 8E:
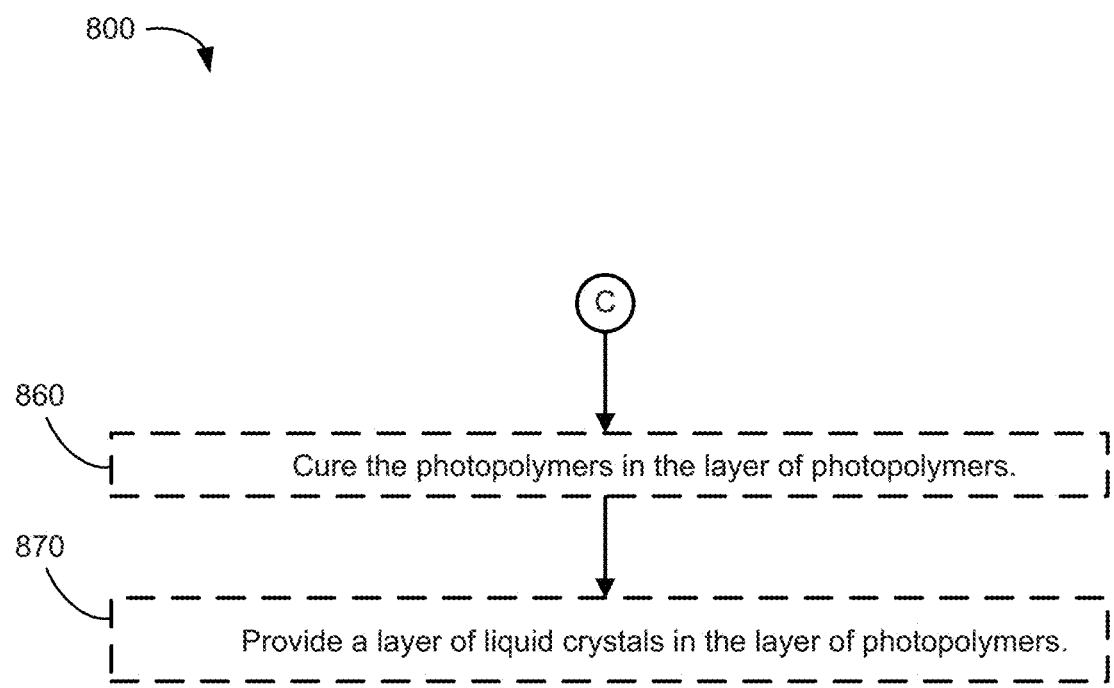

This transition can create issues with the alignment of portions of photoalignment layer 116 along different paths. For example, as shown in FIG. 7E, which illustrates aligned photopolymers in the layer of photopolymers 116 after the alignment process in accordance with some embodiments, portions 116-1 116-$i$, and 116-$j$ are offset from each other by a distance d in the x-direction. The offset may be due to errors in repeatability, accuracy, and precision of mechanical components involved in the transition (e.g., the ability for a translation stage that photoalignment layer 116 is located on to precisely return to the same starting position along the x-direction for each raster scan). Comparing the raster-scan method shown in FIGS. 7A-7E, the raster-scan method shown in FIG. 6A-6E, is faster and provides improved precision and/or uniformity in the alignment of photopolymers on photoalignment layer 116. Yet, compared to a point-by-point raster scanning method using a circular beam having the same resolution as focused beam 124, the method described with respect to FIGS. 6A-6D or 7A-7D, using a focused beam with a high aspect ratio to align a layer of photopolymers, still provides better precision and/or uniformity in the alignment of photopolymers.

FIGS. 8A-8E illustrate a flow chart representation of a method 800 of aligning a layer of photopolymers in accordance with some embodiments, as described above, with reference FIGS. 1 and 4A-4E.

In accordance with some embodiments, a method of aligning a layer of photopolymers includes (step 810) projecting incident light (e.g., ray 120) onto a first optical element (e.g., first optical element 112) while (step 820) rotating the first optical element about a first optical axis (e.g., optical axis 130) of the first optical element. The first optical element, when rotated to a first position, converts the incident light into first light having first polarization (e.g., beam 122 having first polarization). The first optical element, when rotated to a second position, converts the incident light into second light having second polarization (e.g., beam 122 having second polarization). The method also includes (step 830) asymmetrically focusing the first light into a first region of the layer of photopolymers and asymmetrically focusing the second light into a second region of the layer of photopolymers.

In some embodiments, the incoming light (e.g., ray 120) is laser light. In some embodiments, the incoming light is polarized. In some embodiments, the incoming light is linearly polarized. In some embodiments the incoming light has a wavelength between 300 and 850 nm.

In some embodiments, the first region and the second region each has a surface area with an aspect ratio of at least 2,500:1.

In some embodiments, each of the respective regions (e.g. the first region and the second region) has an aspect ratio of at least 100:1. In further embodiments, each of the respective regions has an aspect ratio of at least 1,200:1.

In some embodiments, the first region includes a first portion (e.g., first portion 116-1) of the layer of photopolymers (e.g., photoalignment layer 116) that are aligned in a first direction in response to the first light and the second region includes a second portion (e.g., second portion 116-2) of the layer of photopolymers (e.g., photoalignment layer 116) that are aligned in a second direction in response to the second light.

In some embodiments, the surface area of each of the first region and the second region have a length of at least 5 mm and a width of at most 2 μm.

In some embodiments, illuminated area 115 has a length 421 that is at least 5 mm and a width 420 that is at most 2

μm. In some embodiments, first portion 116-1 has a length l that is at least 5 mm and a width w that is at most 2 μm. In some embodiments, each of the first light and the second light is provided to a respective surface region (e.g., illuminated area 115) that has a length of at least 2 mm and a width of at most 800 nm. In some embodiments, each of the first light and the second light is provided to a respective surface region (e.g., illuminated area 115) that has a length of at least 1 mm and a width of at most 400 nm.

In some embodiments, the incident light (e.g., ray 120) has an initial polarization direction. The first polarization is a first linear polarization in a first polarization direction that forms a first angle (e.g., first angle 212-1) with the initial polarization direction. The second polarization is a second linear polarization in a second polarization direction having a second polarization angle (e.g., second angle 212-2) with the initial polarization direction.

In some embodiments, (step 830) asymmetrically focusing the first light onto a first region of the layer of photopolymers (e.g., photoalignment layer 116) includes (step 840-A) steering the first light (e.g., beam 124 having first polarization) toward the first region of the layer of photopolymers and (step 830) asymmetrically focusing the second light (e.g., beam 124 having second polarization) onto a second region of the layer of photopolymers (e.g., photoalignment layer 116) includes (step 842-A) steering the second light toward the second region of the layer of photopolymers.

In some embodiments, the speed that each of the first light and the second light (e.g., beam 124) moves across a surface of the layer of photopolymers (e.g., photoalignment layer 116) is varied by changing the speed of the light.

In some embodiments, method 800 further includes (steps 841-A and 843-A) steering the light output from the first optical element (e.g., first optical element 112) toward different regions of the layer of photopolymers (e.g., photoalignment layer 116) while rotating the first optical element. For example, the method may include steering light output from the first optical element from the first region to the second on the layer of photopolymers while rotating the first optical element from the first position to the second position.

In some embodiments, the method further includes (step 840-B) moving the layer of photopolymers (e.g., photoalignment layer 116) concurrently with rotating the first optical element (e.g., first optical element 112) so that the first light is asymmetrically focused onto the first region of the layer of photopolymers and the second light is asymmetrically focused onto the second region of the layer of photopolymers (e.g., moving photoalignment layer 116 so that beam 124 having the first polarization illuminates the first region, including first portion 116-1, and beam 124 having the second polarization, illuminates the second region including second portion 116-2).

In some embodiments, photoalignment layer 116 is moved, for example by an xy stage, to a first position and the focused first light illuminates at least first portion 116-1 of photoalignment layer 116. Photoalignment layer 116 is then moved to a second position so that the focused second light illuminates the second portion 116-2 of the layer of photopolymers.

In some embodiments, the first region has a length (e.g., length 421) of at least 5 mm and a width (e.g., width 420) of at most 2 μm and the second region has a length of at least 5 mm and a width of at most 2 Step 840-B may include (step 841-B) moving the layer of photopolymers in a direction along the width of the first region. For example, moving photoalignment layer 116 may be moved along the width 420 of the first region, e.g., along the y-direction as shown in FIGS. 1A and 1B. In other words, photoalignment layer 116 may be moved along the y-direction so that beam 124 is effectively scanned across the surface of photoalignment layer 116 in the y-direction.

In some embodiments, (step 843-B) the first optical element (e.g., first optical element 112) is rotated at a constant rate of rotation and the layer of photopolymers (e.g., photoalignment layer 116) is moved at a constant speed that corresponds to (e.g., is equal to, is proportional to) the constant rate of rotation.

Alternatively, in some embodiments, the method includes rotating the first optical element from the first position to the second position prior to moving the layer of photopolymers while the layer of photopolymers remains stationary. In some embodiments, the method further includes moving the layer of photopolymers while the first optical element remains stationary. In some embodiments, the layer of photopolymers is moved prior to providing the second light to the layer of photopolymers.

In some embodiments, the layer of photopolymers is moved at a variable speed. In some embodiments, the speed that the light (e.g., beam 124) moves across a surface of the layer of photopolymers is varied to change the pitch (e.g., pitch 422 and/or pitch 424). In some embodiments, the speed that the light is moved across the surface of the layer of photopolymers is varied by changing the speed at which the layer of photopolymers is moved. In some embodiments, the speed that the light moves across the surface of the layer of photopolymers is varied by changing the position of the light along a direction of the layer of photopolymers.

In some embodiments, (step 850) the first optical axis (e.g., optical axis 130 is along a propagation direction of the incident light (e.g., ray 120). The first optical element has a second optical axis (e.g., optical axis 134) that is perpendicular to the first optical axis. The second optical axis forms a first angle (e.g., first angle 212-1) with a reference axis (e.g., reference axis 132) when the first optical element is rotated to the first position and the second optical axis forms a second angle (e.g., second angle 212-2) with a reference axis when the first optical element is rotated to the second position. The second angle is distinct from the first angle.

In some embodiments, (step 852) the first optical element (e.g., first optical element 112), when rotated to a third position, converts the incident light (e.g., ray 120) into third light having third. The second optical axis (e.g., optical axis 134) forms a third angle (e.g., fourth angle 212-4) with the reference axis (e.g., reference axis 132) when the first optical element is rotated to the third position. The third angle is 90 degrees from the first angle (e.g., first angle 212-1) and is distinct from the second angle (e.g., second angle 212-2). The third polarization is the same as the first polarization (e.g., first polarization 201-1 and third polarization 201-3 are the same). The third light is focused onto a third region of the layer of photopolymers. The third region is distinct from each of the first region and the second region of the layer of photopolymers.

In some embodiments, (step 854) the first optical element (e.g., first optical element 112), when rotated to a fourth position, converts the incident light (e.g., ray 120) into fourth light having fourth polarization. The second optical axis (e.g., optical axis 134) forms a fourth angle with the reference axis (e.g., reference axis 132) when the first optical element is rotated to the fourth position. The fourth light is focused onto a fourth region of the layer of photopolymers.

The fourth region is distinct from each of the first region, the second region, and the third region of the layer of photopolymers.

In some embodiments, the first optical element is rotated in the first direction (e.g., clockwise).

In some embodiments, (step 856) subsequent to being rotated to the third position, the first optical element (e.g., first optical element 112) is rotated again to the first position. The first optical element, at the first position, converts the incident light (e.g., ray 120) into fifth light having the first polarization. The fifth light is focused onto a fifth region of the layer of photopolymers distinct from each of the first region, the second region and the third region of the layer of photopolymers.

In some embodiments, a distance between the first portion and the third portion corresponds to (e.g., equals) a distance between the third portion and the fifth portion (e.g., pitch 422 and pitch 424 are equal in length). Alternatively, a distance between the first portion and the third portion may differ from a distance between the third portion and the fifth portion (e.g., pitch 422 differs from pitch 424).

In some embodiments, focusing the first light includes providing only the first light having the first polarization without providing any other light having a polarization distinct from the first polarization onto the first portion (e.g. illuminating area 115, including first portion 116-1, with beam 124 having the first polarization without illuminating the area with light having any other polarization). In some embodiments, focusing the second light includes providing only the second light having the second polarization without providing any other light having a polarization distinct from the second polarization onto the second portion (e.g. illuminating area 115, including second portion 116-2, with beam 124 having the second polarization without illuminating the area with light having any other polarization).

In some embodiments, the method further includes (step 860) curing (e.g., polymerizing) the photopolymers in the layer of photopolymers (e.g., photoalignment layer 116). In some embodiments, the method further includes (step 870) providing a layer of liquid crystals on the layer of photopolymers.

In accordance with some embodiments, an apparatus (e.g., apparatus 100, 101) for aligning a layer of photopolymers (e.g., photoalignment layer 116) includes a first optical element (e.g., first optical element 112) and a second optical element (e.g., second optical element 114). The first optical element is configured to receive and transmit incident light (e.g., receive ray 120 and output ray 120 as beam 122). The second optical element is configured to asymmetrically focus the light (e.g., asymmetrically focus beam 122 as beam 124) transmitted by the first optical element. The first optical element is further configured to be rotated about its optical axis (e.g., optical axis 130). The first optical element, when rotated to a first position, is configured to convert the incident light into first light (e.g., beam 124 having a first polarization) having first polarization. The first light is asymmetrically focused by the second optical element onto a first region of the layer of photopolymers. The first optical element, when rotated to a second position, is configured to convert incident light into second light (e.g., beam 124 having a second polarization) having second polarization. The second light is asymmetrically focused onto a second region of the layer of photopolymers.

In some embodiments, the second optical element has an optical profile that is axially asymmetric (e.g., not axisymmetric). The second optical element is configured to focus the first light (e.g., beam 124 having first polarization) onto the first region on the layer of photopolymers (e.g., photoalignment layer 116) and to focus the second light (e.g., beam 124 having second polarization) onto the second region on the layer of photopolymers. The first region and the second region on the layer of photopolymers each have a surface area with an aspect ratio of at least 2500:1. The first region includes the first portion (e.g., first portion 116-1) of photopolymers that are aligned in a first direction in response to the first light the second region includes the second portion (e.g., second portion 116-2) of photopolymers that are aligned in a second direction in response to the second light. The second direction is distinct (e.g., different) from the first direction.

In some embodiments, the second optical element (e.g., second optical element 124) is a cylindrical lens configured such that the first region and the second region each having has a surface area with an aspect ratio of at least 2500:1.

In some embodiments, the apparatus (e.g., apparatus 100, 101) also includes a stage (e.g., translation stage 119) configured to move the layer of photopolymers (e.g., photoalignment layer 116) to a first position so that the first light (e.g., beam 124 having first polarization) is asymmetrically focused onto the first region of the layer of photopolymers and to subsequently move the layer of photopolymers to a second position so that the second light (e.g., beam 124 having second polarization) is asymmetrically focused onto the second region of the layer of photopolymers.

In some embodiments, the apparatus (e.g., apparatus 100, 101) also includes a steering module (e.g., 510) configured to steer the asymmetrically focused first light (e.g., beam 124-1) toward a first region of the layer of photopolymers (e.g., photoalignment layer 116) and to subsequently steer the asymmetrically focused second light (e.g., beam 124-2) toward the second region of the layer of photopolymers.

In some embodiments, the first region includes the first portion (e.g., first portion 116-1) of the layer of photopolymers and the second region includes the second portion (e.g., second portion 116-2) of the layer of photopolymers.

Figure 9:
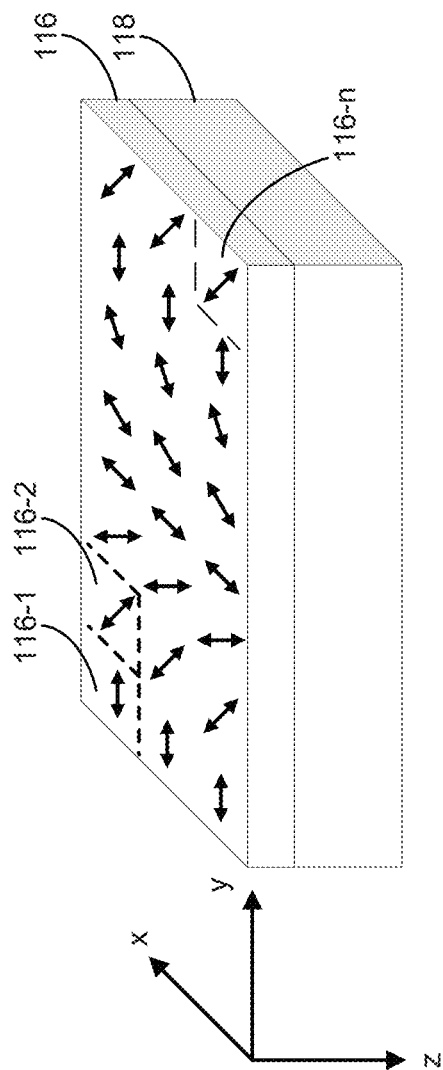
FIG. 9 illustrates a layer of aligned photopolymers in accordance with some embodiments.

FIG. 9 illustrates a layer of photopolymers (e.g., photoalignment layer 116) in accordance with some embodiments. Photoalignment layer 116 with photopolymers that have been aligned by the method described herein, with respect to FIGS. 1 and 4A-4E (e.g., method 800), is shown. First portion 116-1 having photopolymers aligned in the first orientation, second portion 116-2 having photopolymers aligned in the second orientation, and nth portion 116-n of photoalignment layer 116 are illustrated by dashed lines. In some embodiments, as shown, photoalignment layer 116 is disposed on a substrate 118.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments.

However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method for aligning a layer of photopolymers, the method comprising:
projecting incident light onto a first optical element while rotating the first optical element about a first optical axis, wherein
the first optical element, when rotated to a first position, converts the incident light into first light having first polarization; and
the first optical element, when rotated to a second position, converts the incident light into second light having second polarization;
asymmetrically focusing the first light onto a first region of the layer of photopolymers; and
asymmetrically focusing the second light onto a second region distinct from the first region of the layer of photopolymers,
wherein the first region and the second region each has a surface area with an aspect ratio of at least 2,500:1.

2. The method of claim 1, wherein.
the first region includes a first portion of photopolymers that are aligned in a first direction in response to the first light; and
the second region includes a second portion of photopolymers that are aligned in a second direction in response to the second light, the second direction being distinct from the first direction.

3. The method of claim 1, wherein
the surface area of each of the first region and the second region has a length of at least 5 mm and a width of at most 2 µm.

4. The method of claim 1, wherein:
the incident light has an initial polarization in an initial polarization direction;
the first polarization is a first linear polarization in a first polarization direction that forms a first angle with the initial polarization direction; and
the second polarization is a second linear polarization in a second polarization direction having a second polarization angle with the initial polarization direction.

5. The method of claim 1, wherein:
asymmetrically focusing the first light onto a first region of the layer of photopolymers includes steering the first light toward the first region of the layer of photopolymers; and
asymmetrically focusing the second light onto a second region of the layer of photopolymers includes steering the second light toward the second region of the layer of photopolymers.

6. The method of claim 5, further comprising steering light output from the first optical element toward different regions of the layer of photopolymers while rotating the first optical element.

7. The method of claim 1, further comprising moving the layer of photopolymers concurrently with rotating the first optical element so that the first light is asymmetrically focused onto the first region of the layer of photopolymers and the second light is asymmetrically focused onto the second region of the layer of photopolymers, wherein the first optical element is rotated at a constant rate of rotation and the layer of photopolymers is moved at a constant speed that corresponds to the constant rate of rotation.

8. The method of claim 1, wherein:
the first optical axis is along a propagation direction of the incident light;
the first optical element has a second optical axis perpendicular to the first optical axis;
the second optical axis forms a first angle with a reference axis when the first optical element is rotated to the first position; and
the second optical axis forms a second angle with a reference axis when the first optical element is rotated to the second position, the second angle being distinct from the first angle.

9. The method of claim 8, wherein the first optical element, when rotated to a third position, converts the incident light into third light having third polarization, and wherein the second optical axis forms a third angle with the reference axis when the first optical element is rotated to the third position, the third angle is 90 degrees from the first angle and is distinct from the second angle;
the third polarization is the same as the first polarization; and
the third light is focused onto a third region of the layer of photopolymers distinct from each of the first region and the second region of the layer of photopolymers.

10. The method of claim 9, wherein:
the first optical element, when rotated to a fourth position, converts the incident light into fourth light having fourth polarization;
the second optical axis forms a fourth angle with the reference axis when the first optical element is rotated to the fourth position; and
the fourth light is focused onto a fourth region of the layer of photopolymers distinct from each of the first region, the second region and the third region of the layer of photopolymers.

11. The method of claim 9, wherein:
subsequent to being rotated to the third position, the first optical element is rotated again to the first position in which the first optical element converts the incident light into fifth light having the first polarization; and
the fifth light is focused onto a fifth region of the layer of photopolymers distinct from each of the first region, the second region and the third region of the layer of photopolymers.

12. The method of claim 11, wherein a distance between the first region and the third region corresponds to a distance between the third region and the fifth region.

13. A method for aligning a layer of photopolymers, the method comprising:
projecting incident light onto a first optical element while rotating the first optical element about a first optical axis, wherein
the first optical element, when rotated to a first position, converts the incident light into first light having first polarization; and
the first optical element, when rotated to a second position, converts the incident light into second light having second polarization;
asymmetrically focusing the first light onto a first region of the layer of photopolymers; and
asymmetrically focusing the second light onto a second region distinct from the first region of the layer of photopolymers, wherein:

the method further comprises moving the layer of photopolymers concurrently with rotating the first optical element so that the first light is asymmetrically focused onto the first region of the layer of photopolymers and the second light is asymmetrically focused onto the second region of the layer of photopolymers;

the first region has a length of at least 5 mm and a width of at most 2 μm;

the second region has a length of at least 5 mm and a width of at most 2 μm; and moving the layer of photopolymers includes moving the layer of photopolymers in a direction along the width of the first region.

14. The method of claim 13, wherein:

the first optical axis is along a propagation direction of the incident light;

the first optical element has a second optical axis perpendicular to the first optical axis;

the second optical axis forms a first angle with a reference axis when the first optical element is rotated to the first position; and the second optical axis forms a second angle with a reference axis when the first optical element is rotated to the second position, the second angle being distinct from the first angle.

15. The method of claim 14, wherein the first optical element, when rotated to a third position, converts the incident light into third light having third polarization, and wherein the second optical axis forms a third angle with the reference axis when the first optical element is rotated to the third position, the third angle is 90 degrees from the first angle and is distinct from the second angle;

the third polarization is the same as the first polarization; and the third light is focused onto a third region of the layer of photopolymers distinct from each of the first region and the second region of the layer of photopolymers.

16. An apparatus for aligning a layer of photopolymers, comprising:

a first optical element configured to receive and transmit incident light; and a second optical element configured to asymmetrically focus the light transmitted by the first optical element, wherein the first optical element is further configured to be rotated about its optical axis;

the first optical element, when rotated to a first position, is configured to convert the incident light into first light having first polarization, the first light being asymmetrically focused by the second optical element onto a first region of the layer of photopolymers;

the first optical element, when rotated to a second position, is configured to convert the incident light into second light having second polarization, and the second light being asymmetrically focused onto a second region of the layer of photopolymers;

the second optical element has an optical profile that is axially asymmetric such that the first region and the second region each has a surface area with an aspect ratio of at least 2500:1;

the first region includes a first portion of photopolymers that are aligned in a first direction in response to the first light and the second region includes a second portion of photopolymers that are aligned in a second direction in response to the second light, the second direction being distinct from the first direction.

17. The apparatus of claim 16, further comprising:

a stage configured to move the layer of photopolymers to a first position so that the first light is asymmetrically focused onto the first region of the layer of photopolymers, and to subsequently move the layer of photopolymers to a second position so that the second light is asymmetrically focused onto the second region of the layer of photopolymers.

18. The apparatus of claim 13, further comprising:

a steering module configured to steer the asymmetrically focused first light toward the first region of the layer of photopolymers and to subsequently steer the asymmetrically focused second light toward the second region of the layer of photopolymers.

19. An apparatus for aligning a layer of photopolymers, comprising:

a first optical element configured to receive and transmit incident light and a second optical element configured to asymmetrically focus the light transmitted by the first optical element, wherein the first optical element is further configured to be rotated about its optical axis;

the first optical element, when rotated to a first position, is configured to convert the incident light into first light having first polarization, the first light being asymmetrically focused by the second optical element onto a first region of the layer of photopolymers;

the first optical element, when rotated to a second position, is configured to convert the incident light into second light having second polarization, and the second light being asymmetrically focused onto a second region of the layer of photopolymers; and the second optical element is a cylindrical lens configured such that the first region and the second region each has a surface area with an aspect ratio of at least 2500:1.

20. The apparatus of claim 19, further comprising:

a stage configured to move the layer of photopolymers to a first position so that the first light is asymmetrically focused onto the first region of the layer of photopolymers, and to subsequently move the layer of photopolymers to a second position so that the second light is asymmetrically focused onto the second region of the layer of photopolymers.

* * * * *

UNITED STATES PATENT AND TRADEMARK OFFICE
CERTIFICATE OF CORRECTION

PATENT NO. : 11,067,855 B2
APPLICATION NO. : 16/407020
DATED : July 20, 2021
INVENTOR(S) : Amirsolaimani et al.

Page 1 of 1

It is certified that error appears in the above-identified patent and that said Letters Patent is hereby corrected as shown below:

In the Claims

Claim 18, Column 18, Line 20, please delete "claim 13," and insert --claim 16,--.

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*